(12) United States Patent
Ribeiro et al.

(10) Patent No.: US 11,867,255 B2
(45) Date of Patent: Jan. 9, 2024

(54) CHAIN LINK FOR BICYCLES

(71) Applicant: SRAM DEUTSCHLAND, Schweinfurt (DE)

(72) Inventors: Bruno Ribeiro, Aveiro (PT); Pedro Santos, Coimbra (PT); Diogo Silva, Coimbra (PT); Matthias Reinbold, Würzburg (DE); Henrik Braedt, Hambach (DE); John Collen, San Luis Obispo, CA (US)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 170 days.

(21) Appl. No.: 16/750,817

(22) Filed: Jan. 23, 2020

(65) Prior Publication Data

US 2020/0158208 A1 May 21, 2020

Related U.S. Application Data

(62) Division of application No. 15/803,386, filed on Nov. 3, 2017, now Pat. No. 10,982,734.

(30) Foreign Application Priority Data

Nov. 3, 2016 (DE) .................... 10 2016 013 112.8
Oct. 16, 2017 (DE) .................... 10 2017 009 632.5

(51) Int. Cl.
*F16G 13/06* (2006.01)
*B62M 9/00* (2006.01)

(52) U.S. Cl.
CPC ....... *F16G 13/06* (2013.01); *B62M 2009/005* (2013.01)

(58) Field of Classification Search
CPC .......................... F16G 13/06; B62M 2009/005
See application file for complete search history.

(56) References Cited

U.S. PATENT DOCUMENTS 953,427 A * 3/1910 Morse .................... F16G 13/06
474/229
1,529,243 A 3/1925 Drake et al.
(Continued)

FOREIGN PATENT DOCUMENTS

CN  1667294 A  9/2005
CN  101012863  8/2007
(Continued)

OTHER PUBLICATIONS

IWIS, "Chain engineering Design and construction Examples of calculation", IWIS Website, Nov. 30, 2006, 86 pages, http://www.iwis.de/uploads/tx-sbdownlo ader/KettenHandbuch E.pdf.
(Continued)

*Primary Examiner* — Minh Truong

(57) ABSTRACT

A roller-type chain for a bicycle is configured with asymmetrical chain link plates, the chain link plates applicable for use with a chain with reduced chain width as in use on chain drives with a high number of gear ratios. The chain link plates are configured at the inner side of the chain loop for engagement on the teeth of the rear sprocket and of the front chain wheel. The chain link plates are further configured at the outer side of the chain loop for interaction with the chain-guiding roller on the rear gearshift mechanism.

4 Claims, 15 Drawing Sheets

(56) References Cited

U.S. PATENT DOCUMENTS

| | | | |
|---|---|---|---|
| 4,186,617 A * | 2/1980 | Avramidis | F16G 13/06 474/229 |
| 4,265,134 A | 5/1981 | Dupoyet | |
| 4,596,539 A | 6/1986 | Yamasaki | |
| 4,741,725 A | 5/1988 | Ingold | |
| 5,066,265 A * | 11/1991 | Wu | F16G 13/06 474/212 |
| 5,741,196 A | 4/1998 | Campagnolo | |
| 7,712,298 B1 | 5/2010 | Wang | |
| 2012/0322599 A1 | 12/2012 | Oishi et al. | |
| 2015/0094182 A1* | 4/2015 | Fukumori | F16G 13/06 474/206 |
| 2016/0153526 A1* | 6/2016 | Wang | F16G 13/06 474/226 |
| 2017/0067536 A1* | 3/2017 | Dos Santos | F16G 13/06 |
| 2017/0307049 A1* | 10/2017 | Fukumori | F16G 13/06 |
| 2019/0100278 A1* | 4/2019 | Fukumori | F16G 13/06 |
| 2019/0101189 A1* | 4/2019 | Akanishi | F16G 13/06 |

FOREIGN PATENT DOCUMENTS

| | | | |
|---|---|---|---|
| DE | 93477 A1 | 8/1897 | |
| DE | 2829424 A1 | 2/1979 | |
| DE | 19705018 | 9/1997 | |
| DE | 19705018 A1 | 9/1997 | |
| DE | 20314167 U1 * | 11/2003 | F16G 13/06 |
| DE | 102004011572 A1 | 9/2005 | |
| DE | 202010008814 U1 | 12/2010 | |
| DE | 102018116403 A1 * | 2/2019 | B62M 9/12 |
| EP | 0236184 B1 | 9/1988 | |
| EP | 1574746 | 9/2005 | |
| EP | 1816372 | 8/2007 | |
| FR | 812827 A | 5/1937 | |
| FR | 2632599 A1 * | 12/1989 | F16G 13/06 |
| GB | 1595091 A | 8/1981 | |
| GB | 2000846 A | 1/1982 | |
| JP | 2001208140 | 8/2001 | |
| JP | 2005172097 | 6/2005 | |
| JP | 5975139 | 8/2016 | |
| TW | 201249709 A * | 12/2012 | F16G 13/06 |
| TW | 201536627 A | 10/2015 | |

OTHER PUBLICATIONS

Iwis: Chain engineering Design and construction Examples of calculation, IWIS Website, Nov. 30, 2006 (Nov. 30, 2006), http://www.iwis.de/uploads/tx_sbdownloader/KettenHandbuch_E.pdf, Last checked Mar. 2, 2023.

Japanese Standards Association, JIS D 9417:2004 Bicycles-Chains (English Version), JIS Japanese Industrial Standard Bd. D 9417,1. Sep. 1, 2004, XP009520190.

* cited by examiner

--Prior Art--

CHAIN LINK FOR BICYCLES

This application is a divisional application of and claims priority to, and/or the benefit of, U.S. patent application Ser. No. 15/803,386, filed Nov. 3, 2017, the application claims priority to, and/or the benefit of, German patent application DE 10 2016 013 112.8, filed on Nov. 3, 2016, and German patent application DE 10 2017 009 632.5, filed Oct. 16, 2017, the contents of which are included by reference herein in their entirety.

BACKGROUND OF THE INVENTION

The present invention relates to a roller-type chain, which is of asymmetrical form with respect to the longitudinal axis, for bicycles.

SUMMARY

Roller-type chains as drive chains for bicycles with a derailleur system from the prior art are made up of chain links which are arranged so as to be pivotable relative to one another and by means of which a closed chain loop for drive force transmission is formed. A chain link is composed in particular of a pair of inner link plates or outer link plates. The link plates have in each case two end regions with rounded outer contours, which end regions are connected by a connecting region with a normally waisted outer contour. In the end regions, holes are provided concentrically with respect to the outer contour.

Alternately arranged inner link plate and outer link plate chain links are rotatably connected to one another at the chain joints by chain pins. The holes are situated concentrically with respect to the outer contours of the rounded end regions of the link plates. The chain pins are pressed into the holes in the outer link plates, while a degree of play is present in each case between the holes in the inner link plates and the chain pins in order to ensure rotatability.

It is sought to configure the spacings between the link plates to be as large as possible in a direction perpendicular to the inner surface of the link plates. On the inner link plates, which are situated closer together, catching bevels serve for realizing a run-in funnel for those teeth of the sprocket which enter the link plate intermediate space.

In the development of derailleur systems for bicycles which are composed of a front sprocket, a roller-type chain, a rear multiple sprocket and associated transfer devices, the number of sprockets on the multiple sprocket has increased ever further in stepwise fashion. Associated with this are modifications to the dimensions of sprockets, chain link plates, chain pins and chain rollers, in particular to the dimensions in the direction parallel to the longitudinal axis of the chain pins. Thus, the chain is adapted to the rear sprockets which are positioned with an ever smaller axial spacing to one another on the rear-wheel hub. Here, it is clear that parts of the chain pins which protrude beyond the outer side of the chain link plates are also obstructive, because they can come into contact in an undesired and disruptive manner with parts of the adjacent sprocket.

A reduction of the dimensions of the parts of the chain in the course of the development leads to the problem of an increase in loads on the chain parts. Changed requirements for the production of the chain link plates also arise.

BRIEF DESCRIPTION OF THE DRAWINGS

FIG. 1 shows the known chain in a perspective view;

FIG. 2 shows the known chain as per FIG. 1, viewed in a direction in the plane of extent of the chain link plates;

FIG. 3 shows the inner link plate of the chain as per FIGS. 1 and 2 in a perspective view, viewed from the inner surface of the link plate;

FIG. 4 shows the inner link plate of the chain as per FIGS. 1 and 2 in a perspective view, viewed from the outer surface of the link plate;

FIG. 5 shows the inner link plate of the chain as per FIGS. 1 and 2, viewed from the outer surface of the link plate in the direction of the holes for receiving the chain pins;

FIG. 6 shows the outer link plate of the chain as per FIGS. 1 and 2 in a perspective view, viewed from the inner surface of the link plate;

FIG. 7 shows the outer link plate of the chain as per FIGS. 1 and 2 in a perspective view, viewed from the outer surface of the link plate;

FIG. 8 shows the embodiment of the chain in a perspective view;

FIG. 9 shows the embodiment of the chain as per FIG. 8, viewed in a direction in the plane of extent of the chain link plates;

FIG. 10 shows the inner link plate of the chain as per FIGS. 8 and 9 in a perspective view, viewed from the inner surface of the link plate;

FIG. 11 shows the inner link plate of the chain as per FIGS. 8 and 9 in a perspective view, viewed from the outer surface of the link plate;

FIG. 12 shows the inner link plate of the chain as per FIGS. 8 and 9, viewed from the outer surface of the link plate in the direction of the holes for receiving the chain pins;

FIG. 13 shows the outer link plate of the chain as per FIGS. 8 and 9 in a perspective view, viewed from the inner surface of the link plate;

FIG. 14 shows the outer link plate of the chain as per FIGS. 8 and 9 in a perspective view, viewed from the outer surface of the link plate;

FIG. 15 shows the inner link plate of the known chain as per FIGS. 1 and 2, viewed from the side of an end region in the direction of the longitudinal axis with a special design of the bevels on the outer contour of the end region;

FIG. 16 schematically shows a known chain loop which is formed from a piece of chain by virtue of the two ends being connected by means of two 1-shaped fastener elements;

FIG. 17 shows the embodiment of an asymmetrical chain as per FIGS. 8 and 9 in engagement on a rear set of sprockets in a perspective view;

FIG. 18 shows FIG. 17 viewed in a direction in the plane of extent of the chain link plates;

Figure 1:
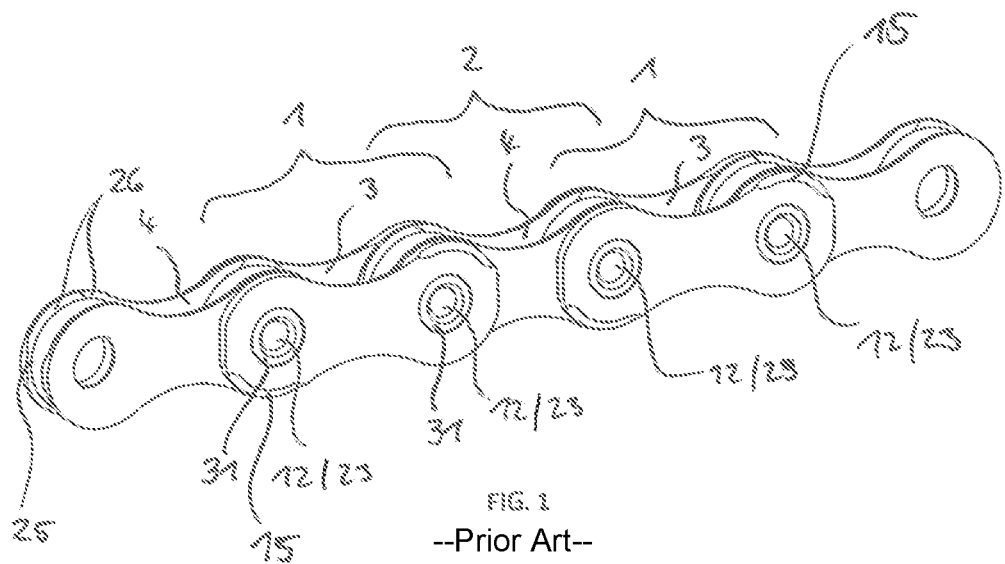
FIGS. 1 to 7 show a known chain in which features may also be utilized as in the asymmetrical roller-type chain according to an embodiment for bicycles, whereby the context of the use of the basic concept of the asymmetry of the chain link plates is presented.

Below, an asymmetrical chain will be described in comparison with a conventional chain.

DETAILED DESCRIPTION

To solve the problem of increased loads, the invention utilizes, in addition to the advantages of asymmetrical chain link plates, the preservation of the cross sections that are subjected to load. This means that the increase of loads that occurs as a result of a reduction of the dimensions in one direction is compensated by means of the increase of the dimensions in other directions. The asymmetry is an asymmetry with respect to the longitudinal axis or longitudinal plane through the two geometric axes of the two chain pins on in each case one chain link. Aside from the aspect of the reduction of loads, further effects are achieved with such asymmetrical chain link plates, such as an improvement in the guidance of the chain during engagement on the front and rear sprockets.

Said asymmetry has already been utilized in the case of roller-type chains for bicycles. In the roller-type chain according to an embodiment, further features are added with regard to the outer contour of the chain link plates, and further effects are sought, such as improved guidance of the chain on the sprockets in conjunction with good behavior of the chain as it passes from teeth on the sprocket to the adjacent sprocket during gearshifts.

Altogether, in the case of chains for bicycles, it is sought to design the chain such that it can be laid onto the sprockets in any conceivable orientation. This leads to symmetry with respect to a point. This is however not the aim of the present inventive concept.

Chains of designs which deviate from axial symmetry with respect both to the longitudinal direction and with respect to the transverse direction are known.

For example, a rotation of the chain strand about its longitudinal axis through 180 degrees, with the two longitudinal rows of alternating inner link plates and outer link plates being interchanged, exhibits rotational symmetry. In the case of an unchanged viewing direction from above onto the tension strand of the chain mounted on the bicycle, asymmetrically arranged form elements are provided both at the left front, at a position facing toward the viewer, and at the right front, at a position averted from the viewer.

Another situation is a rotation of the chain strand about an axis perpendicular to the plane through the axes of the chain pins through 180 degrees, which is also associated with the two longitudinal rows of alternating inner link plates and outer link plates being interchanged. Then, symmetry is preserved, in the case of an unchanged viewing direction from above onto the tension strand of the chain mounted on the bicycle, asymmetrically arranged form elements are provided both at the left front and at the right rear.

The conditions resulting from both rotations in combination must be satisfied if it is sought for the chain to be capable of being mounted on the sprockets on the bicycle in any orientation without changes arising. This situation is departed from for example if, in the case of an unchanged viewing direction from above onto the tension strand of the chain mounted on the bicycle, chain link plates which are visible on the left are to be adapted with regard to their geometrical design for interaction with the rear sprockets for an optimum gearshift process, whereas the chain link plates which are visible on the right are adapted for interaction with the front sprockets on the pedal cranks for an optimum gearshift process. If the geometrical differences between the left-hand and right-hand chain link plates are only small and identifiable only with difficulty, then incorrect mounting of the chain on the bicycle can occur, and the advantages associated with the different designs of said rows of link plates may become disadvantages.

The roller-type chain on bicycles interacts with the teeth on sprockets. Said sprockets are front sprockets on the pedal crank and rear sprockets on the rear wheel of the bicycle. The roller-type chain is normally formed into a chain loop by virtue of the two ends being connected to one another, which chain loop has a chain loop inner side and a chain loop outer side and which chain loop extends substantially along a central plane. Owing to the very limited mobility of the chain links perpendicularly relative to the central plane, the chain loop inner side and the chain loop outer side are defined when the ends of the original chain piece are connected. Only the inner side of the chain loop interacts with the teeth on the stated sprockets. Only the upper chain-guiding rollers on rear derailleurs interact with the outer side of the chain loop.

In order that the conditions both during the engagement of the teeth into a sprocket and during the transfer from one sprocket to the adjacent sprocket are preserved, it is the case in exemplary embodiments of the chain that the outer contour of the link plates pointing toward the inner side of the chain loop is adopted from conventional chains.

In the case of the asymmetrical design of the chain, some of the stated disadvantages are avoided. For the user of the chain, during the mounting of the chain on the bicycle, by way of clearly visible differences on the chain link plates, it is clear that one chain side corresponds to a position at the inside on the chain loop and the opposite side of the chain corresponds to a position on the outside on the chain loop. It is thus made practicable for the chain to be easily handled as an asymmetrical chain.

Accordingly, the appearance of the chain is such that the two different sides of the chain are clearly visible and distinguishable. The side of the chain which is provided for the inner side of a chain loop should be arranged at the inner side of the chain loop. The user can easily comply with this inter alia simply because the clearly differently designed outer contour of the chain link plates may make it difficult, or else completely impossible, for the chain links to be placed in engagement with the sprocket teeth not provided for engagement therewith.

As such, when using the chain, incorrect mounting is substantially ruled out, and said asymmetrical chain is made suitable for practical use. The approach of using asymmetrical chain links is consistent with the design of conventional roller-type chains for bicycles in accordance with the load, and is based on this use.

The inner link plates and the outer link plates of conventional chains are punched out of sheet metal as raw material. They have in each case a pair of end regions and a connecting region which connects the pair of end regions. The end regions are larger in the direction of the plane of the raw material than in the connecting regions. This leads to balanced load conditions with the present dimensioning.

The main load on the chain link plates arises owing to the chain tension force in the longitudinal direction of the link plates. Furthermore, in the case of the outer link plates, there are also ring forces arising owing to the chain pins pressed into the holes. In the case of inner link plates, torsional forces about the longitudinal direction of the chain strand are also of significance. Such torsional forces arise in particular if the chain is transferred between the sprockets during the gearshift process and the chain tension force is not reduced, that is to say if the bicycle rider continues to pedal with high force during the gearshift process.

A design of the link plates which is advantageous with regard to the stress arising in the link plates has proven to be one in which the spacing of the outer contour of the link plates from the central plane through the axes of the chain pins is equal to the radial dimension of the rings around the hole of the end regions. Based on this design principle, in the case of the design according to an embodiment of the chain, the dimension of the connecting region, the spacing between the central plane and the outer contour of the chain link plates at the position of the chain loop inner side, is preserved, that is to say is not reduced. This has the advantage that the geometric conditions present for the engagement between chain link plates and sprocket teeth are preserved. This relates both to the engagement conditions during the gearshift process and during the transfer of the chain from one sprocket to the adjacent sprocket, and also during the normal drive situation without a gearshift process.

The contour of the chain link plates of the chain at the chain loop outer side is selected such that the spacing between the longitudinal plane in which the axes of the chain pins lie and the contour is much larger than in the case of conventional chains. A noticeable effect arises if said spacing is increased by even half of the radius of the hole in the link plates.

In an embodiment, the contour line is selected to be tangential to the rounded outer contours of the two end regions of the link plates. Contour lines which deviate from this are possible, for example in the form of circular arcs at the rounded outer contours of the two end regions.

Chain inner link plates with an asymmetrical shape of the outer contour with respect to the longitudinal plane or the longitudinal axis are known, for example from the patent documents GB 1595091; U.S. Pat. No. 4,596,539, FR 812827, EP 0236184, DE 2829424. In the case of such solutions, it is sought to create space for the passage past a tooth during the gearshift process. For this purpose, the outer contour of chain link plates at the link plate contour provided at the chain loop inner side is, in relation to conventional chains, much closer to the longitudinal axis of the link plates. As a result, loads on the chain are greatly increased, because high bending moments caused by the chain tension force now arise in the chain link plate, which bending moments give rise to additional tensile stresses at the link plate contour at the chain loop inner side. Said tensile stresses are in addition to the tensile stresses that must already be absorbed in the link plates. The cited documents make no mention of this fact and do not disclose the necessary compensation of additional tensile stresses. Furthermore, in the cited documents, the chains behave differently during the gearshift process, because the modified link plate contour at the chain loop inner side is significantly involved in the process of the transfer of the chain to the adjacent sprocket. There, the chain comes into contact with elements in the gearshift slots on the sprockets.

U.S. Pat. No. 7,712,298 presents a chain fastener element which ultimately, in its mounted state, becomes a constituent part of a chain loop. Said chain fastener element then takes the place of an outer link plate chain link and thus, like the latter, has link plates.

A difference of the presented fastener element in relation to an outer link plate chain link consists in that the chain pins are not pressed at the end of said fastener element into holes in the link plates. Instead, elongated holes oriented substantially in the longitudinal direction of the link plates are provided for receiving the ends of the fastener element pins in positively locking fashion. During the mounting of the fastener element, a constriction on a pin end (31) is moved along an elongated hole until said constriction releasably engages with detent action at the end of the elongated hole. The outer contour of the link plate of the fastener element is adapted to the shape of the elongated hole, wherein that side of the fastener element which is provided for the inner side of the chain loop has an outer contour which corresponds to the outer contour of a conventional chain link plate. Thus, the situation is avoided in which the fastener element, in interaction with the teeth of the sprockets, behaves differently than an outer link plate chain link.

A first aspect of the concept according to an embodiment consists in a preservation or increase of the cross-sectional area of the link plates in the connecting region. This relates at least to the inner link plates, in the case of which as large as possible a clear width between the connecting region of the pair of said inner link plates is of importance in order to realize expedient conditions for the engagement of the teeth on the sprockets, and possibly also to the outer link plates. One conspicuous change in relation to conventional chains consists in that the originally waisted connecting region of the link plates is enlarged in the direction of the plane of extent of the link plate.

It is thus possible, in the case of a reduction of the material thickness of the link plates, for the load-bearing capacity thereof to be preserved. The reduction of the material thickness can be utilized for an adaptation of the chain to the conditions of rear multi-sprocket arrangements with an ever increasing number of sprockets.

If the conventional material thickness is preserved, then the load-bearing capacity of the chain can be increased, which is desirable for example in the case of electric drives for bicycles, because the loads resulting from the pedal movement of the rider and the electric drive are added together.

If the material thickness of the inner link plates were reduced overall, then space would be gained in the direction parallel to the chain pin axes, which space could be utilized at another location. Said space could be utilized for preserving the axial length of the chain roller in the case of a chain made even narrower, which would be suitable for an ever increasing number of rear sprockets on a multi-sprocket arrangement at the rear wheel.

Chain inner link plates composed of a material with a smaller material thickness are known from GB 1595091. This document however does not mention that anything should be done to counter the reduced strength owing to the smaller material thickness. Also, the inner link plates in said document do not have collars, for which material for deformation must be available. Rather, bushings are inserted into the holes in the inner link plates, on which bushings the chain rollers are mounted.

The collars on the side of the inner link plates facing the oppositely situated inner link plate are formed by deformation of the blank, which was originally punched out of a flat material band. This deformation process, which has similarities to a deep-drawing process, it is also necessary for corresponding material to be provided, from which the tubular collar then "grows", as it were, out of the flat blank.

The conditions for said deformation process are better with greater material thickness of the blank and greater outer diameter of the end region of the inner link plate blank.

In the case of an inner link plate, the material thickness in the connecting region and at the end regions may be selected to be equal to the material thickness of the blank punched out of a material band. The material thickness of the blank cannot be arbitrarily reduced in order to obtain a chain which is narrow in a direction parallel to the chain pins. A reduction of the material thickness of the material band used is subject to limits owing to the required load-bearing capacity of the chain link plate and owing to the abovementioned production conditions for the collars.

As an alternative, the inner side of the inner link plate may be equipped, in the connecting region, with a recess, which has a similar effect to a reduction of the material thickness in said region. In this way, the spacing between the connecting regions in a direction parallel to the chain pins, and thus the link plate intermediate space, is made larger. If, in addition to the recess, an inner link plate protrusion is also provided, then the spacing between the end regions of the inner link plate is smaller than the spacing between the connecting region of the inner link plate. It may then be the case that proper engagement of the tooth tip between the inner link plate ends protruding radially beyond the chain roller is no longer possible.

In the case of an inner link plate of said type that the collars on the inner side of the inner link plate can be produced expediently owing to the large material thickness.

As a possibility for circumventing this problem, consideration is given to providing bevels on the outer contour of the inner link plates in the region of the inner link plate protrusion, or to eliminating the inner link plate protrusion entirely. This will be discussed in more detail further below.

It has been identified that, in general, a reciprocal relationship or contradiction exists between the various effects of inner link plates which protrude in a radial direction beyond the chain roller, forming the inner link plate protrusion.

In the drive situation, in which the roller-type chain interacts with the sprocket, correct functioning of the chain is achieved if the sequence of tooth tips successively entering the link plate intermediate spaces continuously align the chain links such that said chain links are aligned with the central plane of the sprocket. This is not without problems, particularly in the case of chain skew, that is to say in the case of a chain running onto the sprocket in a skewed manner.

During a gearshift from a relatively small to a relatively large sprocket, after the displacement of the chain links in a direction parallel to the chain pins toward the relatively large sprocket owing to the action of a chain-guiding device of a front derailleur or of a rear gearshift mechanism, a first tooth tip on the relatively large sprocket should ultimately also enter the link plate intermediate spaces.

By contrast, during a gearshift from a relatively large sprocket to a relatively small sprocket, after the displacement of the chain links in a direction parallel to the chain pins toward the relatively small sprocket owing to the action of a chain-guiding device, the chain should ultimately entirely pass by a sprocket tooth, with both link plates of a link plate pair, on the side pointing toward the relatively small sprocket. During this process, there is also an intermediate step in which, initially, a displacement of the chain in a direction parallel to the chain pins relative to the sprocket occurs but at least one tooth still enters the link plate intermediate space.

At the start of the engagement of a tooth on a sprocket, it is decided whether the tip of the tooth actually enters where it is desired.

Proper function is achieved if, in the drive situation and during gearshifts to the relatively large sprocket, the chain is again brought into the plane of the sprocket despite skewed running, or if, during the gearshift onto the relatively small sprocket, both link plates of the link plate pair pass by the tooth tip on one side.

If the engagement processes take place differently, then unintended malfunctions occur during the gearshift, or the chain jumps off the sprocket entirely, which possibly occurs only after intermediate steps. During the process of tooth tips protruding into the link plate intermediate space, a "setting of the course", as it were, occurs.

With regard to the link plate intermediate spaces, there are differences between an inner link plate chain link and an outer link plate chain link. In an inner link plate link, there are the inner link plates and the chain rollers, which define the space into which the teeth of the sprockets can enter and engage. Here, contact between the tooth and chain inner link plate may occur already at the start of the engagement process. Bevels on the inner side of the link plate increase the space available for the tooth and facilitate the engagement.

The link plate intermediate space is defined, in the case of an outer link plate link, by the chain rollers, the inner sides of the outer link plates, and those parts of the inner link plates which protrude beyond the chain rollers, if an inner link plate protrusion is provided. In the drive situation, this effect is intensified with increasing chain skew, that is to say the more the rear sprocket is offset relative to the plane of the front sprocket in a direction perpendicular to said plane.

An inner link plate protrusion is however not imperative. It is not provided in all possible embodiments of roller-type chains.

During a gearshift process, the outer periphery of the inner link plate may come into contact in a disruptive manner with the flank of the tooth situated in the tooth intermediate space, bringing the chain link plate into an undesired position.

An inner link plate protrusion has an adverse effect if, for example, a gearshift is performed from a relatively large to a relatively small rear sprocket. Then, at the start of the gearshift process, the chain is displaced relative to the sprocket tooth in a direction parallel to the chain pins, and the tip of the sprocket tooth must nevertheless still engage into the space between the outer link plates. Then, in the case of the gearshift from the relatively large to the adjacent relatively small rear sprocket, the contour of an inner link plate on the link plate end may come into contact with the flank of the tooth, if a longitudinal protrusion is provided. Thus, a clean gearshift process is disrupted. This has a particular effect because the tooth flank involved is the load flank on the tooth, which is also involved in the transmission of the drive force, and which therefore cannot be arbitrarily modified in terms of design.

The chain-guiding devices provided at a front derailleur and at a rear gearshift mechanism counteract a jump-off of the chain. A front derailleur, and accordingly a front chain-guiding device, are omitted in the case of roller-type chain drives of a type that has recently been successfully introduced in bicycles. This step was possible with sprockets which have thickened teeth which effectively fill the link plate intermediate space at outer link plate links. Optimized guidance of the chain on the sprocket, which in the case of conventional chain drives is realized only between sprocket tooth and inner link plate link, is thus also realized at outer link plate chain links.

Poor chain guidance may be regarded as a precursor to chain jump-off. Thus, in the drive situation, good chain guidance is conducive to chain jump-off not occurring. Furthermore, chain-guiding devices on the front derailleur or on the rear gearshift mechanism assist in causing a chain that has passed out of engagement with the sprocket to slide back into engagement.

The action of an inner link plate protrusion differs depending on what position of the outer contour of the end region of the inner link plate the inner link plate protrusion is provided at.

In the case of inner link plates which have an inner link plate protrusion, which may be referred to as a longitudinal protrusion, in the vicinity of the longitudinal axis of the chain, said longitudinal protrusion limits the extent to which the chain can move in a direction parallel to the axis of the chain pins when the respective chain roller approaches the tooth flank. The approach occurs already relatively early during the pivoting-in of the chain link in the direction of the tooth space on the sprocket.

An inner link plate protrusion may be provided in the region of the outer contour of the inner link plates, which outer contour is situated approximately parallel to the longitudinal axis and thus in the transverse direction of the chain. This inner link plate protrusion may be referred to as a transverse protrusion. The sections with such a transverse protrusion approach the tooth contour in the tooth space only at the end of the pivoting-in of the chain link, and thus at a later point in time.

Thus, a transverse protrusion has at least an effect with regard to the guidance of the chain during the pivoting-in at the end of the pivoting-in movement of the chain link and with regard to the fixing of the chain links situated in engagement on the sprocket. A transverse protrusion has little effect on the process of the transfer of the chain for the purposes of gearshifts.

A longitudinal protrusion additionally has an effect on the maximum possible chain skew in the presence of which the chain still passes cleanly into engagement with the teeth on the sprocket.

On roller-type chain drives for bicycles with multiple rear sprockets, chain skew inevitably occurs owing to the non-aligned front and rear sprockets which, in the drive situation, are involved in the transmission of force by the chain. The chain skew is greater the further the rear sprocket is situated from the plane of the front sprocket. The situations of smallest front sprocket in combination with the largest rear sprocket and of largest front sprocket in combination with the smallest rear sprocket are the most critical, and are therefore also normally not recommended by the manufacturers of components for bicycle drives. Bicycle users are advised not to use such combinations during practical operation.

If no longitudinal protrusion is provided, then there are no disruptive influences on the gearshift process from the relatively large to the relatively small rear sprocket or front sprocket.

An inner link plate protrusion can thus be estimated to contribute to the guidance of the chain on the sprockets. Alternatively, depending on the specific usage situation, the inner link plate protrusion has a more or less disruptive effect if good chain transfer for the purposes of gearshifts is of importance.

The basic concept according to an embodiment of asymmetrical chain link plates will be combined with further features on the roller-type chain for specific usage situations, which differ with regard to the requirements.

One specific usage situation exists on a racing bicycle, where, as before, it is estimated that a large gear ratio step can be implemented by means of a single gearshift to the adjacent front sprocket.

A complete omission of a longitudinal protrusion, that is to say of a protrusion of the inner link plate relative to the chain roller in the vicinity of the longitudinal axis of the inner link plate, is possible because the devices for the transfer of the chain between various sprockets already have dedicated chain-guiding devices. The skewed running characteristics are thus improved, because the tooth entering the link plate intermediate space does not collide with the longitudinal protrusion.

An abovementioned drive system developed in recent times, in particular for mountain bikes, makes do with only one front sprocket on the pedal crank. In this case, no chain-guiding device of a front derailleur is provided, because said derailleur is omitted entirely. For the guidance of the chain by the teeth on the front sprocket, said teeth are formed alternately in the circumferential direction as thick and thin teeth. The inner link plate protrusion is then additionally utilized for the chain guidance.

The chamfers and bevels on the inner link plate protrusion on the inner link plates are provided in order that the teeth on the sprockets and the chain engage in an effective manner. They go far beyond that which is already known such as a bevel at an angle of 45 degrees for breaking up a sharp edge on a solid part or on a sheet-metal part such as a chain link plate. They form funnel-shaped passages on the chain for the entry and exit of the tooth tips.

Said passages are effective both during the shift process with the transfer of the chain from the relatively small to the relatively large sprocket and during the transfer of the chain from the relatively large to the relatively small sprocket, and also in the drive situation. In the drive situation, the fact that the chain skew must be counteracted plays a major role.

The inner link plate protrusion is divided into longitudinal protrusion and transverse protrusion, as already discussed.

According to the refinement of the chain according to an embodiment, the longitudinal protrusion and transverse protrusion are utilized in embodiments which deviate from one another. This is related firstly to the fact that the longitudinal and transverse protrusions have different effects on the wear, and secondly, under certain conditions, the longitudinal protrusion with its guide function can be omitted, or the longitudinal protrusion is reduced.

On the inner link plate, which protrudes in relation to the chain roller, in the vicinity of the longitudinal axis, that is to say in the case of the longitudinal protrusion, there is situated, until the final working step during the punching and deformation of the inner link plate, a narrow material strip to which the inner link plate, which is formed out of a material band in multiple working steps, remains attached. In the final working step, said narrow strip is then severed, and the inner link plate becomes a separate part. In certain situations it is not possible for the inner link plate protrusion to be provided with a bevel at this position, as already discussed. Consequently, this section of the inner link plate protrusion has a disruptive effect.

Accordingly, this problem is solved in that the inner link plate is provided not with a longitudinal protrusion but with a transverse protrusion, if the guidance function of the longitudinal protrusion can be omitted. This applies in the case of chains which are used in drive systems with sufficient other guide elements, for example with chain-guiding devices both at front derailleurs and at rear gearshift mechanisms.

Upon the contact between the tooth on the sprocket and the bevel surface, material can be partially "smeared", which can lead to burr formation and ultimately jamming of the chain joint.

These effects do not arise in the case of the transverse protrusion. There, the guidance function is desired and can also be utilized. Accordingly, a different bevel angle can be selected at the transverse protrusion.

It is thus possible for the bevels on the longitudinal protrusion, on the one hand, and on the transverse protrusion, on the other hand, to have different bevel angles, the angle between the bevel and the plane formed by the inner link plate inner side. The bevel angle on the longitudinal protrusion is preferably dimensioned to be larger than that on the transverse protrusion. In an embodiment, the link plate has a bevel angle of approximately 38 degrees on the longitudinal protrusion and a bevel angle of approximately 51 degrees on the transverse protrusion.

Thus, the inner side, protruding beyond the chain roller, of the inner link plate is, at the transverse protrusion, available up to a large radial height for the guidance between the tooth on the sprocket and the chain inner link plate.

The asymmetrical outer contour of the chain link plate makes it possible for the chain link plates to be of particularly thin form. The strength of the chain link plate is preserved despite the small material thickness, because the cross section, despite being of reduced thickness in the axial direction, is increased in the transverse direction owing to the asymmetrical form of the link plates, and thus overall remains approximately constant. In an embodiment, a small material thickness of the chain link plates in a range from approximately 0.65 millimeter to 0.75 millimeter is sought. In another embodiment, the inner link plate has a material thickness of 0.70 millimeter. The material thickness of the inner link plates may be reduced yet further by means of a recess in the connecting region thereof. Here, the increase in cross section owing to the asymmetrical form of the inner link plate in the connecting region makes a particularly great contribution to the strength of the link plate. By means of said recess, space is created for the engaging teeth of the sprocket—the link plate intermediate space of a link plate pair is enlarged. The material thickness in the connecting region of the link plate then lies in a range from 0.55 millimeter to 0.65 millimeter. The material thickness in the region of the recess particularly preferably amounts to 0.60 millimeter. It is self-evidently also possible for the outer link plate to have such a recess in the connecting region.

In the case of a chain loop with a clearly defined inner side, as in the case of the asymmetrical chain according to an embodiment, the teeth of a sprocket only ever move from said inner side into the intermediate space between the pair of link plates or into the link plate intermediate space.

This makes it possible for the chain to be made so asymmetrical that the outer side of the chain loop is no longer suitable at all for permitting the entry of the teeth of the sprockets from said side. The connecting sections of the chain link plates are, at the outer side of the chain loop, bent toward one another to such an extent that a link plate intermediate space which is narrowed in wedge-shaped fashion is realized. Said intermediate space may duly still receive the tooth tips of teeth on the sprockets, but the teeth can reach said intermediate space only from the inner side of the chain loop, specifically after having been introduced into the link plate intermediate space from the inner side of the chain loop and having passed the longitudinal plane of the chain link plates.

The connecting sections of the chain link plates must have correspondingly formed elements which project into the link plate intermediate space and which narrow said link plate intermediate space toward the link plate outer contour in wedge-shaped fashion. In the case of conventional chains, similar elements are already known for interaction with the teeth, but said elements had hitherto only ever been effective on the path of the tooth tip from the outer contour of the chain link plate as far as the longitudinal axis of the chain link plate. Now, interaction with the tooth tip exists after said tooth tip has passed the longitudinal axis of the chain link plate and has moved into the space beyond the longitudinal axis.

The clear distinction of the inner side of the chain loop from the outer side of the chain loop creates new possibilities for the guidance of the chain on the teeth of the front and rear sprockets.

For the configuration of roller-type chain drives for bicycles which have only a single front sprocket on the pedal crank, and, owing to the absence of a front derailleur with an associated chain guide, accordingly also do not have said front chain guide, alternative elements have been introduced into said chain drives. For example, the teeth on the front sprockets have been modified in order to be able to seek optimized conditions for the interaction of the roller-type chain and the teeth on the sprockets. Where there were previously teeth with a uniform thickness in the direction parallel to the axis of rotation of the sprocket, these were changed to teeth with alternating thickness in the circumferential direction, in order to realize a correspondence with the alternately relatively large and relatively small intermediate spaces between the chain link plate pairs.

The present concept of a chain with clearly distinguishable inner and outer sides of the chain loop now makes it possible for the chain outer link plates to interact with other sections, which act as chain-guiding elements, on sprockets for the purposes of chain guidance. For this purpose, elements which extend further inward on the chain loop are provided on the outer link plates, which elements interact with sections on the sprocket which have a relatively large dimension parallel to the direction of rotation of the sprocket. Altogether, this gives rise to the situation in which chain-guiding sections provided radially further to the inside on the sprocket interact with the relatively wide outer link plates, and chain-guiding sections provided radially further to the outside on the sprocket interact with the relatively narrow inner link plates.

There are no contradictory conditions because the chain-guiding sections which differ with regard to their radial position on the sprocket interact selectively with the partners provided for them. The relatively wide chain outer link plates, during the process of engagement on the sprocket, extend further radially inward on the sprocket after having passed the chain-guiding sections, arranged radially further to the outside, for the inner link plates, without said chain outer link plates having interacted with said chain-guiding sections for the inner link plates.

A ring-shaped bead which is concentric with respect to the axis of rotation of the sprocket may be provided as an embodiment of chain-guiding sections, to be provided radially further to the inside on the sprocket, for the outer link plates, which is easy to produce.

Narrow chains are of importance in particular for multi-sprocket arrangements with an increased number of 11, 12, 13 or more sprockets. Owing to the small structural space in the axial direction, the sprockets must be positioned with very small spacings to one another. The train of inner and outer link plates arranged alternately on one side of the chain must be dimensioned to be so narrow that it fits into the free spaces between the sprockets without colliding with the next smaller or the next larger sprocket. Furthermore, it is possible for the largest two sprockets to have teeth of different thickness in the axial direction, which have a positive effect on the chain guidance. The thickening of the teeth is advantageously formed on that side of the sprocket which faces toward the adjacent larger sprocket. On that side of the sprocket which faces toward the adjacent smaller sprocket, the teeth are not thickened; otherwise, during the engagement of the chain on a sprocket, contact and thus a disruptive generation of noise between the chain and the teeth on the adjacent larger sprocket would occur. Here, the thickening on the thick teeth is dimensioned to be so large that a thick tooth fits into the link plate intermediate space of an outer link plate link but not into the relatively small link plate intermediate space of an inner link plate link. The sprockets preferably have an even number of teeth, wherein thick and thin teeth alternate along the circumference. The chain engages with a multi-sprocket arrangement arranged on the rear wheel of a bicycle and with a front chain wheel arrangement on a pedal crank with one, two or three chain wheels. In embodiments with only one chain wheel, the chain guidance on the front chain wheel may likewise be improved through the use of alternating thick and thin teeth.

The described chain is of particularly narrow construction. Firstly, the asymmetrical link plates permit a very small link plate thickness while preserving strength. The compensation of the material cross section in the connecting region of the link plates leads to an approximately unchanged tensile strength of the link plates. Furthermore, the strength of the link plates in the ring region can be preserved in the case of a reduced link plate thickness if the diameters of the end regions are also increased. At the end regions, too, it is thus possible for the material cross section of a relatively thin link plate to be compensated. In the case of an unchanged diameter of the hole and an enlarged diameter of the end regions, the ring spacing is thus also increased, which further increases the tensile strength of the link plate.

On the other hand, it is additionally possible to use particularly narrow chain rollers with an increased chain roller diameter, which are likewise conducive to reducing the overall width of the chain. The increased chain roller diameter is conducive to reducing the contact pressure between chain roller and load flank of the tooth. The increased chain roller diameter leads to an increased contact area between chain roller and load flank of the tooth, and thus compensates the reduced chain roller width. Furthermore, an increased chain roller diameter together with an increased diameter of the end regions of the inner link plates permits an unchanged transverse protrusion of the inner link plate beyond the chain roller.

The discussed measures for reducing the overall chain width, i.e. compensation of the material cross section in the connecting region and/or at the end regions of the link plates, tensile strength compensation of the contact area between chain roller and tooth, and contact pressure, may be used separately or in combination. A particularly narrow, stable and wear-resistant chain is realized if the measures are combined.

A creative concept with the enlargement of the diameter of the chain roller in combination with the reduction of the axial length of said chain pin is consistent with the increase in number in an arrangement of an ever increasing number of sprockets in a multi-sprocket arrangement. The axial spacing between the sprockets is smaller. Thus, during the transfer of the chain from one sprocket to the adjacent sprocket, the diversion angle of the chain becomes smaller, and with said reduced diversion angle, the need for a tooth space lengthened in a circumferential direction is also reduced. Accordingly, sufficient space for a tooth still remains in the space between two chain rollers which are adjacent in the chain longitudinal direction.

Given specific functional requirements, a longitudinal protrusion and a transverse protrusion of the inner link plate relative to the chain roller may be necessary. With the enlarged diameter of the chain roller, there is consequently an enlargement of the diameter of the end regions of the inner link plate. This gives rise to a correspondingly sized enlargement of the diameter of the end regions of the outer link plate. Said enlargement of the diameter of the end regions of the outer link plate and of the inner link plate leads, in the case of unchanged diameter dimensions of the collars, to an enlargement of the radial dimension of the ring regions. This is a possible measure for preserving the strength of the ring regions with the implemented reduction of the material thickness of the link plates.

On the other hand, it is desirable not to increase the overall length of the link plates despite the enlargement of the radial dimension of the ring regions. The preservation of the overall length of the link plates is advantageous in particular during the transfer of the chain from a relatively large to a relatively small sprocket, because otherwise, a passage of a chain link laterally past a tooth is thereby slowed and impeded, because a protruding outer link plate collides with the tooth flank in a tooth intermediate space.

The overall length of the link plates can be maintained because the cross sections along the longitudinal plane are not critical with regard to acting stresses. Therefore, a reduction of the cross section is possible there, owing to the reduction of the material thickness, without losses in terms of safety against breakage. As a result, the spacing between the outer periphery of the chain link plates in the direction of the longitudinal plane is smaller than the second spacing between the outer periphery of the chain link plates in the direction of the transverse plane or in a direction at 45 degrees between the longitudinal and transverse planes.

Finally, a preserved overall length of the chain link plates also plays a role in the manufacturing process, that is to say in the punching-out of the chain link plates from a material band. If said overall length is preserved, this then yields the result that the same length of band material is consumed per chain link plate. Furthermore, the feed movement of the band material from one punching operation to the next punching operation is unchanged, which is an advantage.

A chain loop is formed as a result of the connection of the two ends of a chain piece to one another by suitable means, for example by a pair of L-shaped chain connecting elements. Said chain loop has an inner side and an outer side. Owing to the stiffness of the chain piece with respect to torsion about the longitudinal axis of the link plates and with respect to bending in relation to a plane perpendicular to the chain pins, it is not possible for the inner side to be converted to the outer side and vice versa. Thus, with the formation of the chain loop, the inner side and the outer side of the chain loop are positively defined. In the case of the roller-type chain according to an embodiment, it is expedient that the chain sides provided as inner side and as outer side of the chain loop are also easily distinguishable from one another owing to their asymmetrical shaping. One embodiment facilitates the clear distinction of a guide side of the chain links or chain link plates at the outer side of the chain loop and the engagement side of the chain links or chain link plates at the inner side of the chain loop.

The guide side of the chain is optimized for guidance on the guide teeth of the upper chain-guiding roller on the chain guide of a rear gearshift mechanism. The engagement side of the chain is designed for engagement on the front and rear sprockets of a bicycle and for the gearshift processes between said sprockets.

Thus, only the engagement side of the chain, positioned at the inner side of the chain loop, has catching and deflecting bevels for the interaction with the teeth on the rear and front sprockets. Such catching and deflecting bevels are well known.

In the case of the roller-type chain according to an embodiment, in the optimization of the engagement side and of the guide side, deviations inevitably arise in relation to an otherwise symmetrically formed chain.

A chain of asymmetrical form in any case for strength reasons may also be optimized with regard to the design as engagement and guide sides. The connecting region with concave outer periphery is suitable here as engagement side owing to the requirements with regard to the demanded engagement characteristics.

On the guide side of the chain, deflecting and catching bevels for the interaction with the teeth on the rear and front sprockets can be omitted entirely. It is sufficient here to provide an adaptation of the chain link plate for the interaction with the upper chain-guiding roller of the rear gearshift mechanism, wherein it must be ensured that the chain-guiding roller must be capable of displacing and guiding the chain in a direction parallel to the axis of rotation of the sprocket for the purposes of performing gearshifts. Guide bevels or guide projections are provided on the guide side of the chain link plates. U.S. Pat. No. 4,741,725 presents guide projections which are formed as deformed sections on the outer periphery of the outer link plate. Both between a pair of outer link plates and between a pair of inner link plates, there are formed link plate intermediate spaces of similar width for the guide teeth on the chain-guiding roller of a rear gearshift mechanism.

In U.S. Pat. No. 4,741,725, those sections of the chain link plates which are situated opposite the sprocket teeth have, on the outer periphery, recesses in order, during the transfer of the chain from one sprocket to the adjacent sprocket, to permit a passage of the sprocket teeth in a direction parallel to the sprocket axis of rotation. The relative movement of the chain link plate relative to the sprocket tooth that occurs here has fundamental differences in relation to the primarily radial relative movement in the case of an engagement of a tooth into a tooth intermediate space on an outer link plate link.

Guide bevels on the guide side of the chain basically function similarly to catching bevels on the engagement side of the chain link plates. Said guide bevels form a type of "run-in funnel" for the guide teeth on the chain-guiding roller, which are shorter in the radial direction than teeth on sprockets.

By contrast to the situation at the engagement side with engagement and deflecting bevels, modifications are possible on the guide side of the link plates as long as such modifications do not disrupt the guidance function. Modifications may be made to the outer contour of the link plate for the purposes of increasing or preserving the strength.

Furthermore, a narrowing of link plate intermediate spaces may be realized, as discussed in U.S. Pat. No. 4,741,725 with the narrowing of the link plate intermediate space between a pair of outer link plates.

Further differences also exist with regard to the demands on guide bevels, on the one hand, in relation to engagement and deflecting bevels, on the other hand, which differences give rise to various design possibilities.

In the case of conventional roller-type chains for bicycles, a jump-off of the chain can occur if, in the presence of a high tension force in the chain, the tip of a tooth on the sprocket enters a gap between chain roller and inner link plate or between inner link plate and outer link plate. Said high tension force prevails when the chain links run into the tension strand, which is under the action of a high drive force, of the chain. It then occurs that the outer link plate is separated from the chain pin. Bevels at the contact point between inner link plate and outer link plate widen the gap that is present and thus promote the possibility of the tip of the tooth entering the gap. Correspondingly, there are limits with regard to how far the bevels on the outer periphery of the link plates can extend so as to as far as possible not facilitate the detrimental jump-off.

Since, during the diversion of the inner link plate chain link relative to the outer link plate link, the inner link plate is rotated relative to the outer link plate to a greater or lesser degree about the chain pin, the length of the gap may increase or decrease over a length in a manner dependent on the diversion angle.

Deflecting bevels on the outer side of the inner link plate also serve for permitting effective lateral passage of the chain link plate laterally past the sprocket tooth. This situation arises for example during the transfer of the chain from the relatively large to the adjacent relatively small sprocket.

A guide bevel has a relatively small extent proceeding from the outer contour of the chain link plate in the direction perpendicular to the outer contour. Since a guide tooth on a chain-guiding roller enters the link plate intermediate space in said direction, this space thus corresponds with the length of a guide tooth on a chain-guiding roller. The length in the radial direction in the case with a tooth on a sprocket is greater.

By contrast to sprocket teeth, guide teeth on a chain-guiding roller do not cause a jump-off of the chain. Typically guide teeth are not pointed enough for this purpose. Furthermore, the chain tension forces which act on the chain-guiding roller and which arise owing to the chain tensioning by the chain guide of the rear gearshift mechanism are not high enough. Accordingly, in the case of the guide bevels that interact with the guide teeth, there are no limitations, associated with the jump-off of the chain, with regard to the arrangement of bevels on the outer periphery, of link plates at the contact points between chain roller and inner link plate and between inner link plate and outer link plate. Transitions between guide bevels and bevels on the longitudinal protrusion may be correspondingly freely designed, even with regard to simple manufacture.

Contact between a guide tooth on a chain-guiding roller and an inner link plate of the chain occurs substantially in the connecting region and at the transverse protrusion. The longitudinal protrusion as a constituent part of the protrusion of the inner link plate relative to the chain roller around the chain roller does not contribute to the guidance of the chain on a chain-guiding roller, because the guide tooth on the chain-guiding roller is only of short form. It is thus also possible for the bevel on the longitudinal protrusion to be omitted on the guide side of the chain. It is furthermore possible for the radial extent of the longitudinal protrusion to be selected to be larger for the purposes of realizing high strength of the inner link plate.

In the case of conventional symmetrical chains, in the normal drive situation without gearshifts, there is no contact between catching bevels on the inner side of the outer link plates and the sprocket teeth. This means that, in the case of such a chain, the inner side of the outer link plates also cannot come into contact with the guide teeth on the chain-guiding roller.

With the division of the functions between the guide side and the engagement side in the case of the chain according to an embodiment, it is however now possible for the guide side of an outer link plate to be designed such that contact occurs between the guide side of the outer link plate and the chain-guiding roller. This may be realized by means of a modification of the external shape of the outer link plate and by means of bent portions, as presented in U.S. Pat. No. 4,741,725.

A deflecting bevel on the guide side of the outer link plates is not required, simply owing to the assignment, out of principle, of the deflecting function to the engagement side.

It is possible in principle for additional catching bevels and deflecting bevels, which are however not actually required for functional reasons, to be provided on the guide side of the chain. This is however not very expedient, because said bevels are associated with a reduction of the cross sections relevant for the load-bearing capacity of the link plates, and thus a reduction in strength of the chain.

The assignment of the functions of a chain with regard to engagement on sprocket teeth, on the one hand, and guidance on guide teeth of chain-guiding rollers, on the other hand, can be implemented in a particularly expediently practicable manner on a chain with asymmetrical link plates owing to the ease of distinction between engagement side and guide side of the chain, but is not limited to such a chain, and may rather also be implemented on a chain with symmetrical link plates. Then, however, other features should be used in order to preserve the distinguishability of the sides of the chain.

Transitions between different bevels may be freely designed, also with the aim of simple manufacture.

Figure 8:
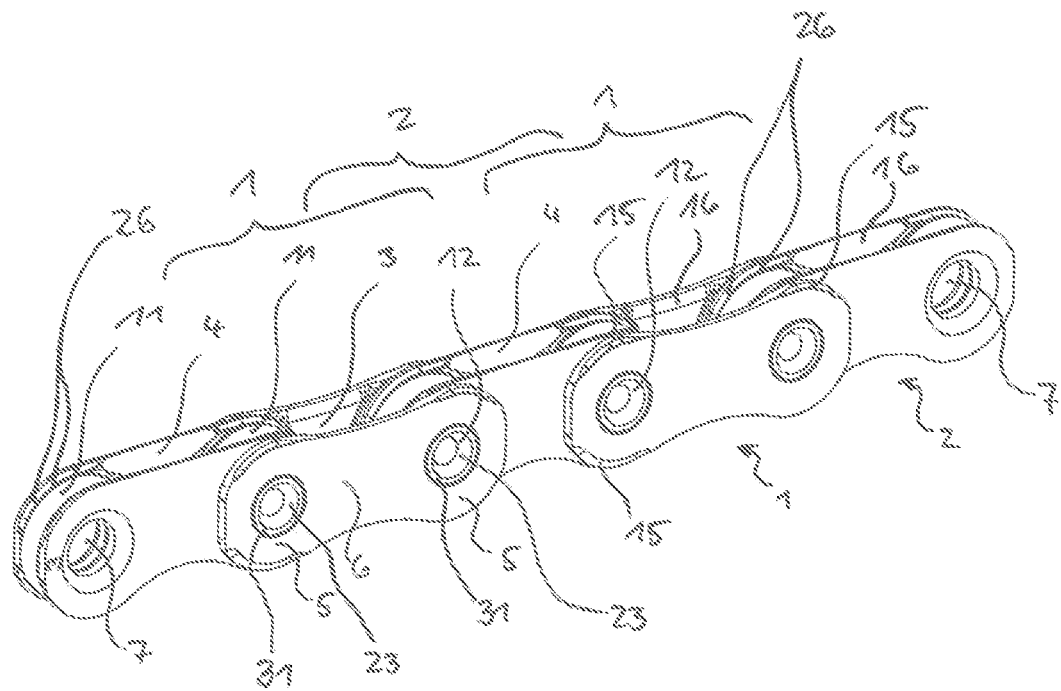
FIGS. 8 to 18 show an embodiment of the chain according to the invention.

FIGS. 1 and 8 show how a roller-type chain for bicycles is constructed from alternately arranged inner link plate links (2) and outer link plate links (1). A chain link (1, 2) is composed in particular of a pair of inner link plates (4) or outer link plates (3). The link plates (3, 4) have in each case two end regions (5) with rounded outer contour (19), which are connected by a connecting region (6) with a normally waisted outer contour (17, 18). In the end regions (5), holes (7) are provided concentrically with respect to the rounded outer contour (19). The rounded outer contour (19) and the end region (5) may be described as defining an end section radius (32)

The alternately arranged inner link plate links (2) and outer link plate links (1) are rotatably connected to one another at the chain joints (23) by means of chain pins (12). The chain pins (12) are pressed into the holes (7) in the outer link plates (3), whereas a degree of play is present in each case between the holes (7) in the inner link plates (4) and the chain pins (12) in order to realize the rotatability between the chain links (1, 2).

The inner link plates (4) each have collars (13) on their inner surface (8), wherein in each case one chain roller (11) is rotatably arranged on a pair of collars (13) arranged mirror-symmetrically with respect to one another. Here, the term "inner surface" refers to that surface of the inner link plate (4) which faces another inner link plate (4) and which, together with said other inner link plate, forms a link plate intermediate space (24). The inner surfaces (8) of a pair of outer link plates (3) also form a link plate intermediate space (24). The outer surfaces (9) of the link plates (3, 4) point away from the link plate intermediate space (24), which can be seen in at least FIGS. 2 and 9.

Figure 5:
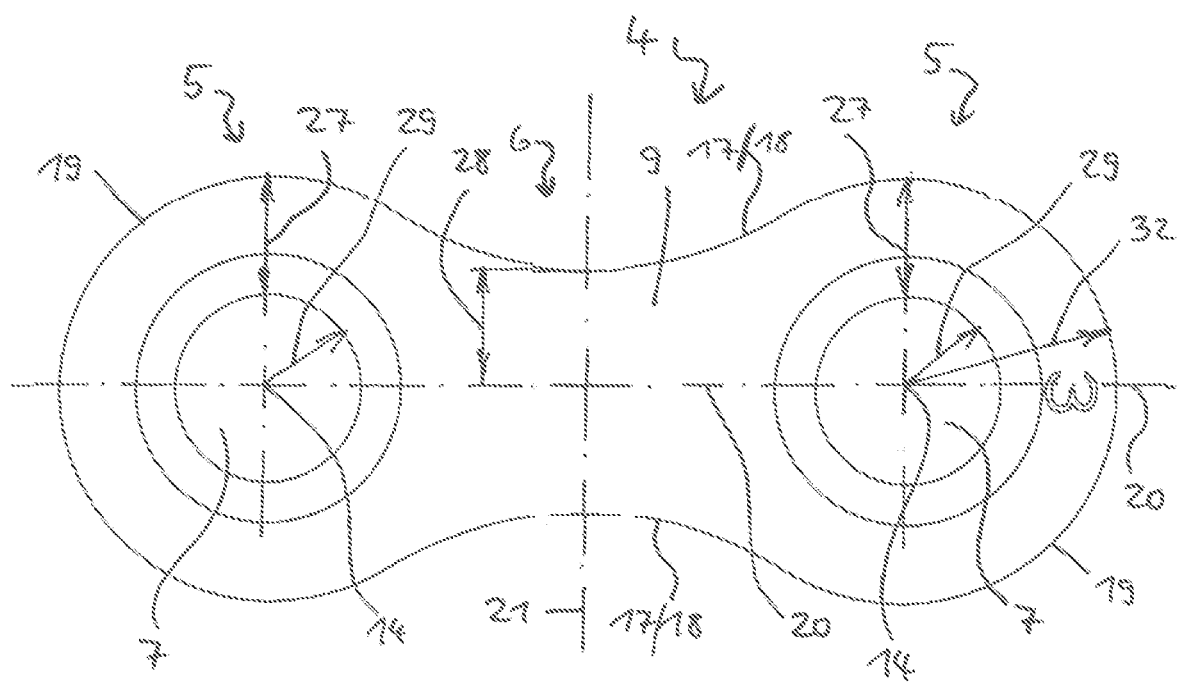
Figure 6:
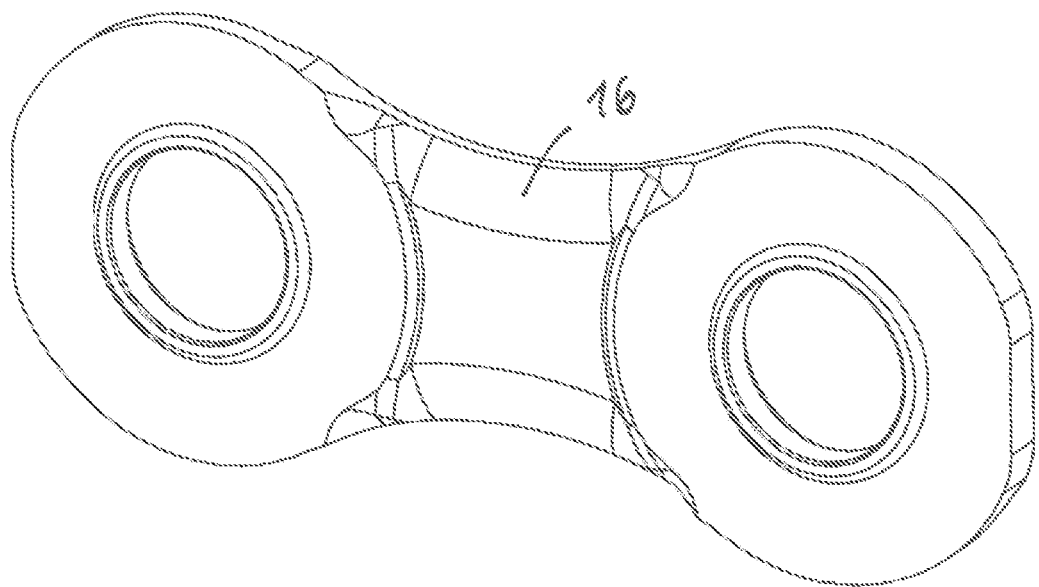
Figure 7:
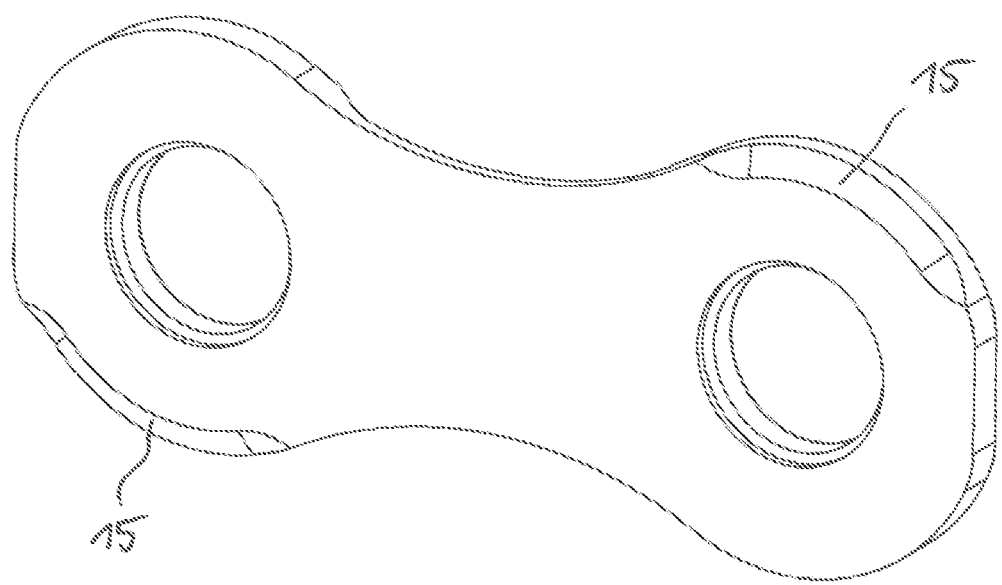

Details on the link plates of a chain from the prior art can be seen in at least FIGS. 3 to 7. It can be seen that both the inner link plates (4) and the outer link plates (3) are, with regard to their outer contour (17, 18, 19), of symmetrical form with respect to the planes (20, 21) illustrated in FIG. 5, which planes, in FIG. 5, are shown as a longitudinal axis (20) through the two hole axes (14) and as a transverse axis (21) centrally with respect to the two end regions (5).

Figure 12:
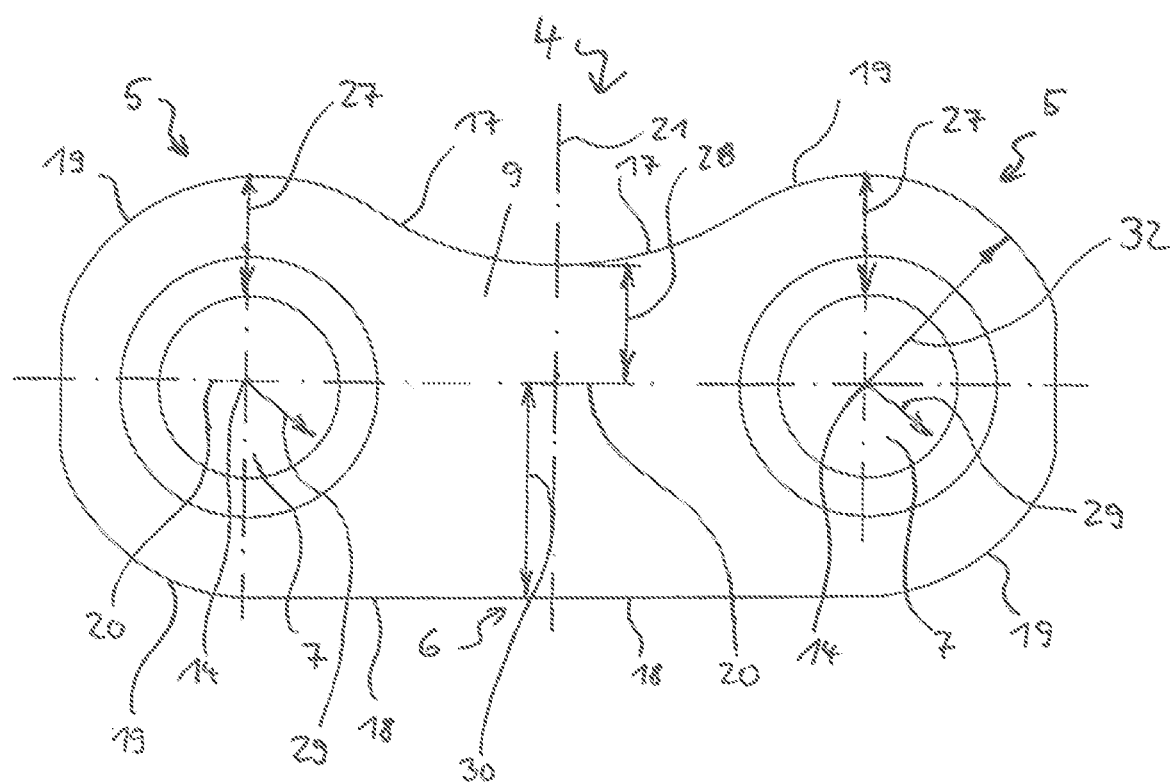

In the development of the chains, a design of the chain link plates selected already at an early point in time, in which the aspects of the acting stresses are taken into consideration, has proven expedient. As shown in FIG. 5, a first margin spacing (28) in the case of the inner link plates (4) of conventional chains is equal to the ring spacing (27) which constitutes the radial thickness of the rings around the hole (7) in the end regions (5) of the inner link plate (4). Thus, both in the connecting region and collectively in the two constituent parts around the hole, cross sections of similar size are available for the acting tension loads. In FIG. 5, it can be seen how the first margin spacing (28) is determined, specifically as the spacing of the outer contour (17 or 18) of the inner link plate (4) to the longitudinal plane (20). The ring spacing (27) is determined between the margin of the hole (7) and the convex outer contour (19) of the respective end region (5). The first margin spacing (28) and the ring spacing (27) are determined in the same way in the case of outer link plates (3), as shown in the exemplary illustration in FIG. 5, which shows the inner link plate (4). In FIG. 12, the relationships in the case of the roller-type chain according to an embodiment are shown based on the example of the inner link plate. Said relationships also apply to the outer link plate of the embodiment which is shown in detail in FIGS. 13 and 14.

Figure 16:
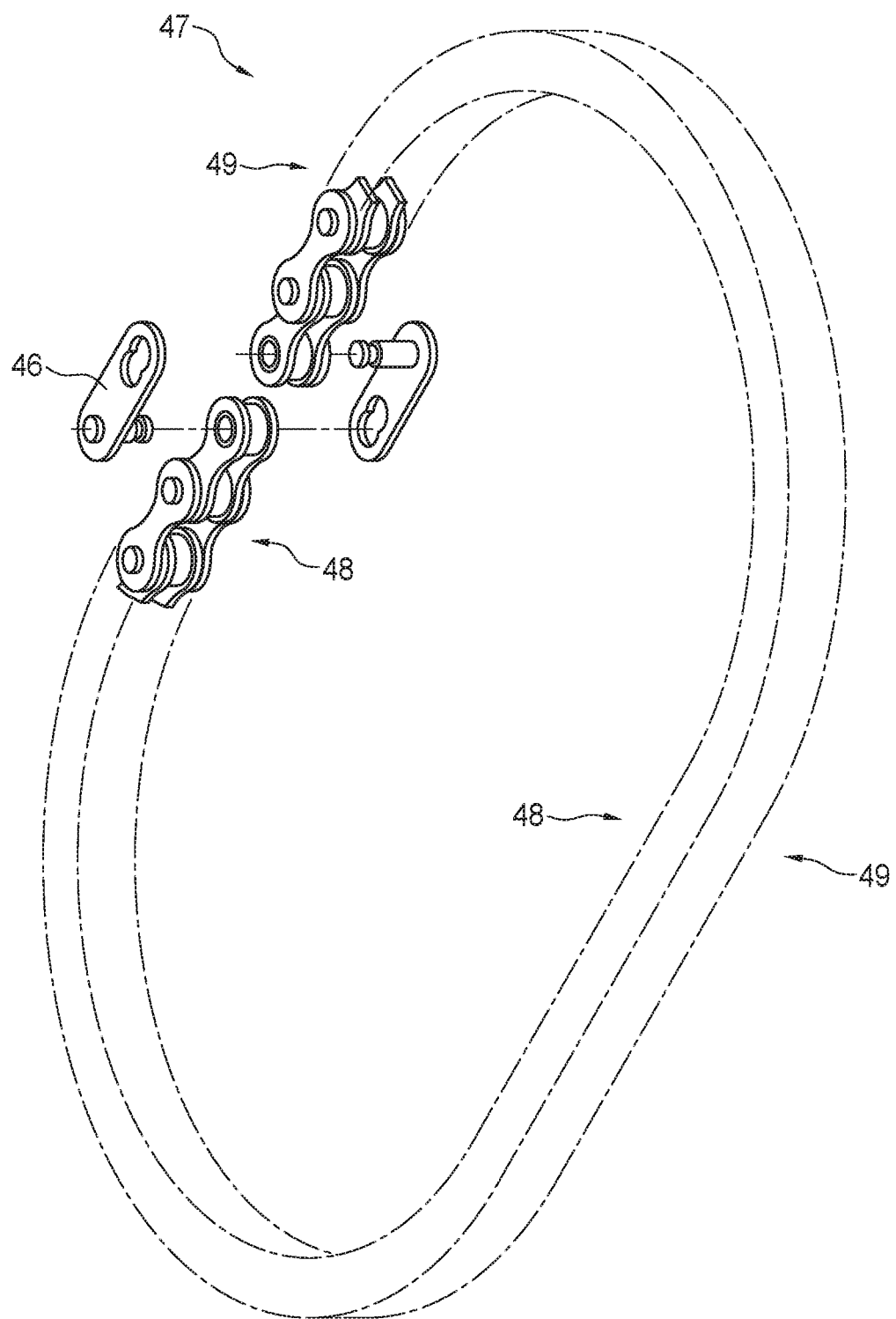

Other embodiments of asymmetrical roller-type chains may be conceptually similar. For example, the asymmetry relationships may also be implemented only for the inner link plate or only for the outer link plate. A closed chain loop as illustrated in FIG. 16 is formed by two fastener elements (46) of L-shaped form or in some other way from a chain piece. Here, an outer contour of the chain in the connecting region inevitably and unchangeably comes to the inner side (48) of the chain loop (47). According to an embodiment, this is intended to be the first outer contour (17), which has a concave profile. The first margin spacing (28) corresponds to the ring spacing (27) and is thus adopted from conventional chains. Thus, the contact conditions between the chain and the plurality of teeth on the front sprocket, on the rear sprocket and on the lower chain-guiding wheel on the rear gearshift mechanism are adopted from conventional symmetrical chains.

The second outer contour (18) is situated opposite the first outer contour (17) on the link plate. In the exemplary embodiment shown in FIG. 12, the second outer contour (18) is a straight line which runs tangentially with respect to the two rounded outer contours (19) of the two end regions (5). The second margin spacing (30) is determined between the longitudinal axis (20) and the second outer contour (18). Said second margin spacing is equal to the sum of hole radius (29) and ring spacing (27) and is thus significantly greater than the first margin spacing (28).

Figure 13:
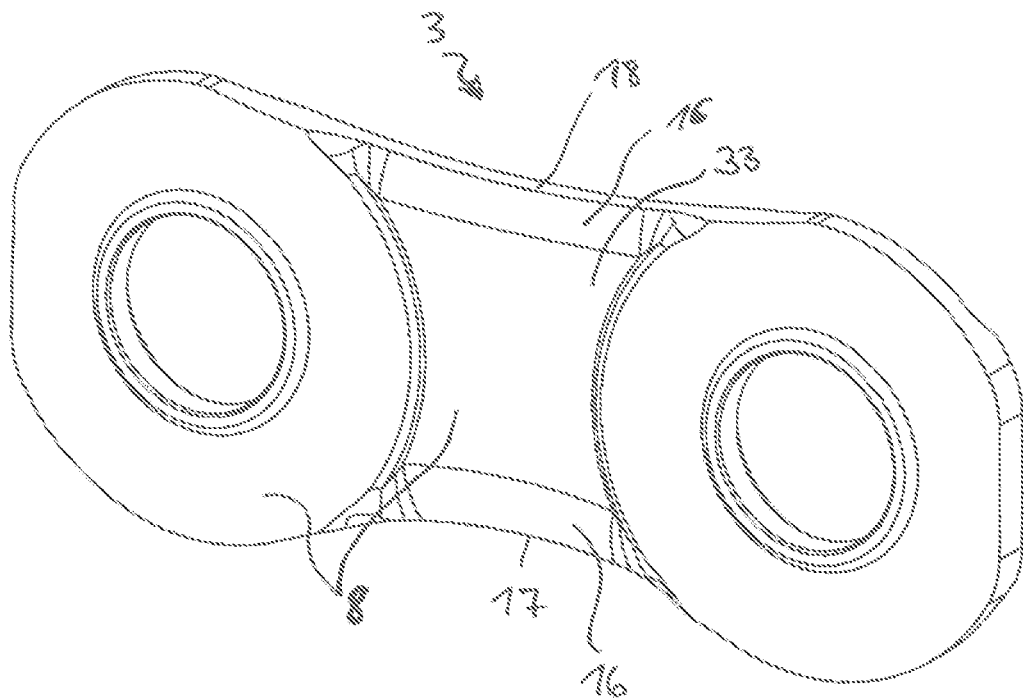

The profile of the second outer contour (18) may also be concave or convex. The profile of the second outer contour (18) shown for the outer link plate (3) in FIGS. 13 and 14 is concave.

FIGS. 8, 9, 10 and 13 show catching bevels (16) on the inner surfaces (8) of the link plates. Such catching bevels (16) are known from the prior art corresponding to the illustrations in FIGS. 1, 2, 3 and 6. The catching bevels (16) serve for facilitating the engagement process of that tooth on the sprocket which enters the link plate intermediate space (24), even in the case of a chain running onto the sprocket in a skewed manner.

Figure 9:
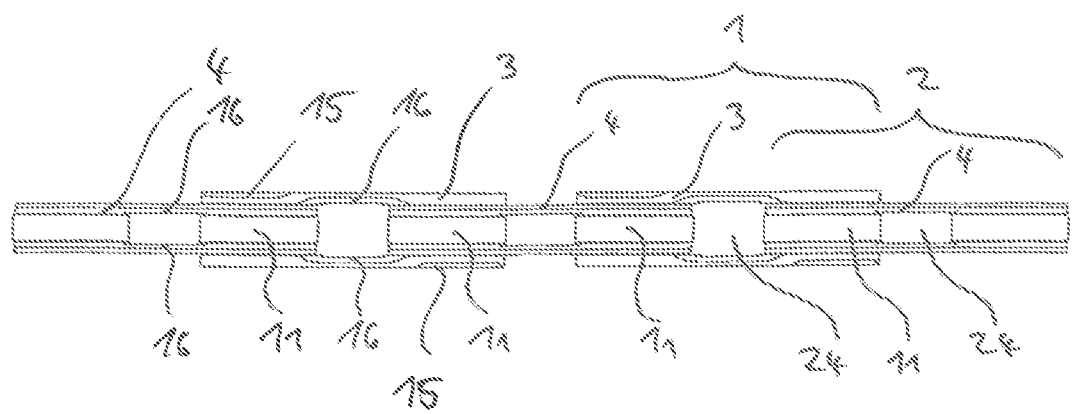
Figure 14:
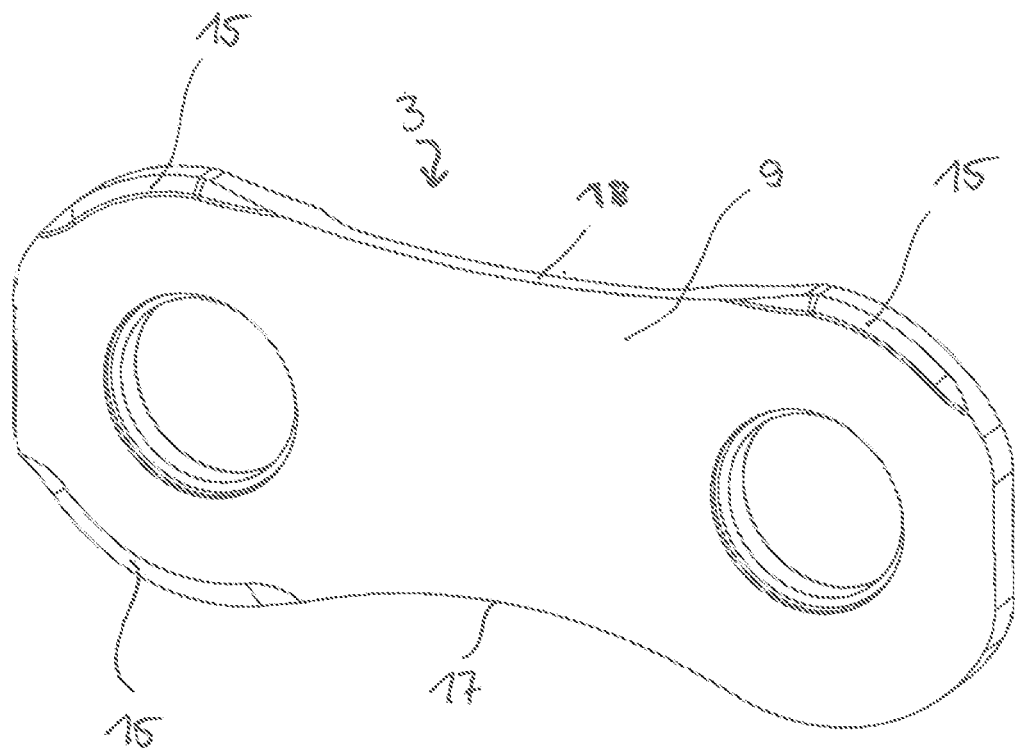

FIGS. 8, 9 and 14 show deflecting bevels (15) on the outer surfaces (9) of the outer link plates (3). Deflecting bevels (15) of said type are known from the prior art corresponding to the illustrations in FIGS. 1, 2 and 7. The deflecting bevels (15) serve for enabling the outer link plate (3) which comes into contact with a tooth on the sprocket to slide off said tooth. Deflecting bevels (15) limit the chain from being able to ride up on a tooth in an undesired manner, which can lead to incorrect engagement of the chain on the sprocket and to chain throw-off.

Figure 2:
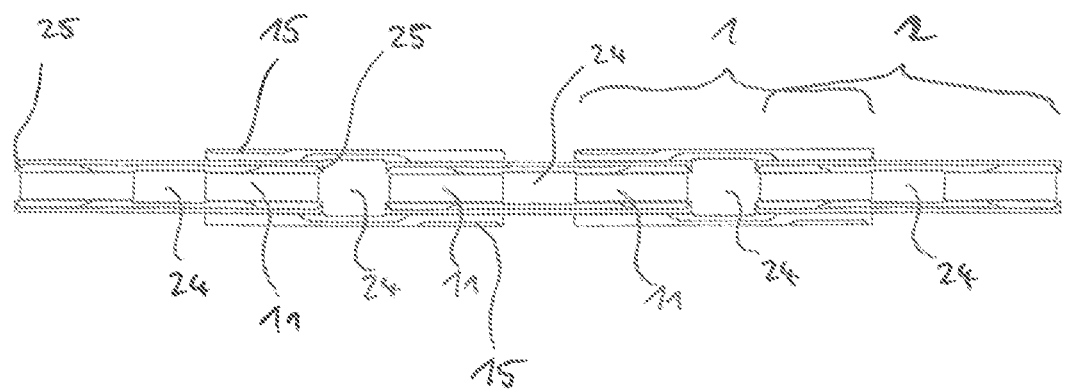
Figure 3:
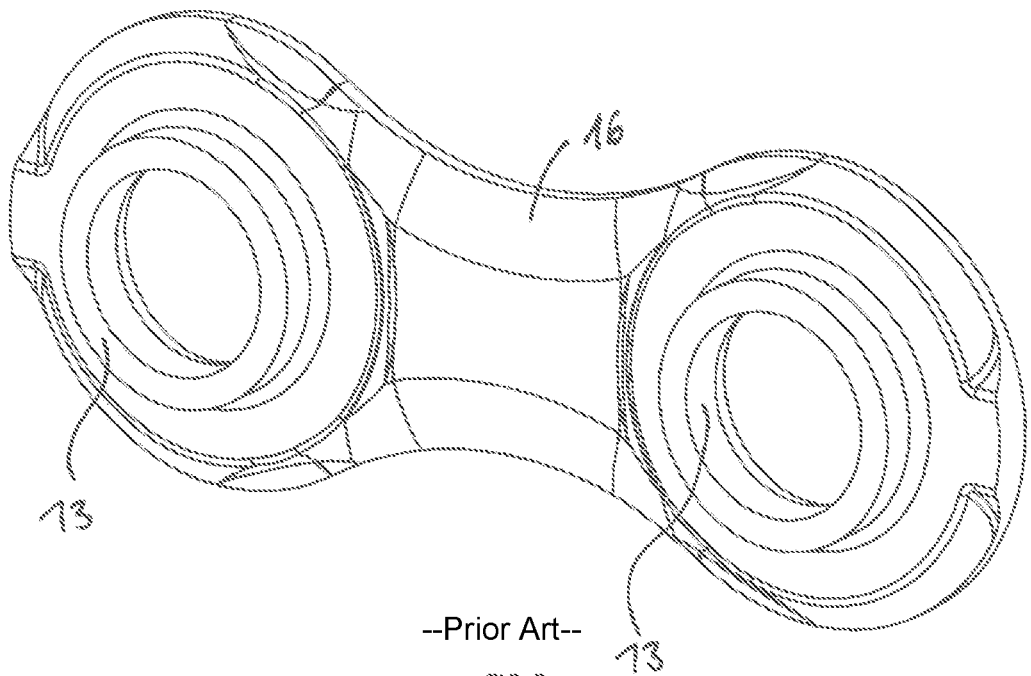
Figure 4:
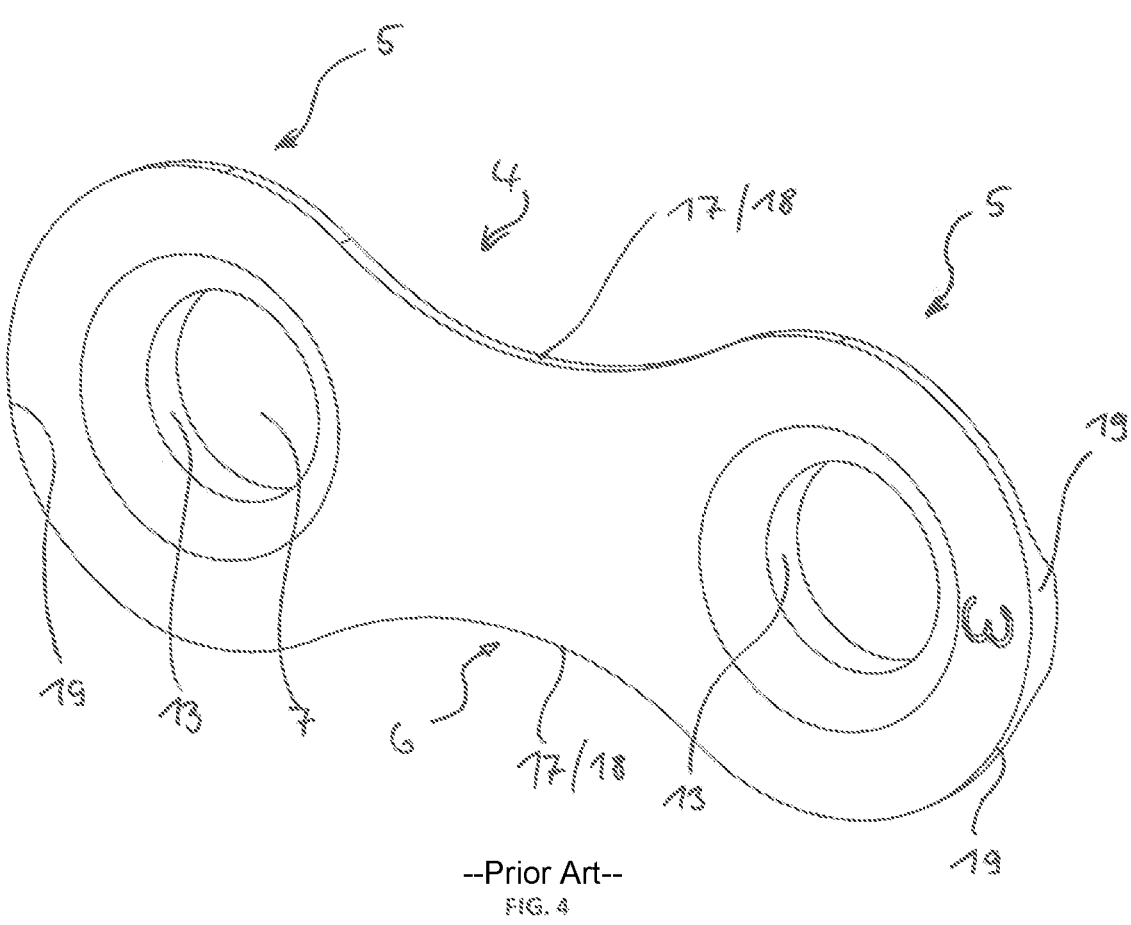

The inner link plate (4) may protrude in a radial direction with respect to the chain roller. Correspondingly, there is an inner link plate protrusion which can be divided into a longitudinal protrusion (25) and a transverse protrusion (26), as illustrated in FIGS. 1 and 2. The longitudinal protrusion on the one hand contributes to the guidance of the chain on the teeth of the sprocket, but on the other hand may have a disruptive effect during gearshift processes, for example during the transfer of the chain from the relatively large to the relatively small rear sprocket. The transverse protrusion (26) acts in particular to hold the chain on the teeth of the sprocket when the chain and the teeth have fully engaged with one another. This can thus contribute to the chain links moving only to a small extent in a direction perpendicular to the plane of the sprocket, and thus to the transverse mobility of said chain links being restricted.

In the preferred embodiment of a chain according to an embodiment, a transverse protrusion (26) is utilized, whereas a longitudinal protrusion (25) is omitted. In FIG. 8, the transverse protrusion (26) is indicated. In FIG. 9, which can be considered in this regard, there is no indication of a longitudinal protrusion (25) in the corners of the link plate intermediate spaces (24). Rather, the chain roller (11) protrudes slightly in relation to the inner link plate (4).

In the exemplary embodiment shown in FIGS. 8 and 9, the transverse protrusion (26) has a bevel angle (35) of approximately 49 degrees. The dimensioning of the bevel angle will be discussed in more detail in conjunction with FIG. 15.

There are various possibilities for providing, in combination, a transverse protrusion (26) but no longitudinal protrusion (25) on an inner link plate (4).

In FIG. 9, it can be clearly seen that the link plate intermediate spaces (24) are enlarged by means of the additional recesses (33) in connecting regions (6) of the inner and outer link plates (4, 3). Specifically in the case of very narrow chains, such as the presently described chain with very narrow chain rollers (11), the link plate intermediate space (24) of the inner link plate links (2) is particularly narrow. The recesses (33) on the inner surfaces (8) in the connecting regions (6) of the inner link plates (4) nevertheless provide enough space for the engagement of the sprocket teeth. The additional catching bevels (16) along the first and second outer contours (17, 18) furthermore facilitate the catching of the sprocket teeth. The transition from the recess (33) to the catching bevel (16) may run tangentially, that is to say without edges. Thus, particularly smooth and quiet sliding of the sprocket teeth into and out of the link plate intermediate spaces (24) is supported.

The recesses (33) may be arranged both on the inner surfaces (8) of the inner link plates (4) and on the outer link plates (3). The recesses (33) may be produced by material deformation, for example pressing, or by material removal, for example milling. Here, the outer surface (9) of the link plate preferably remains flat in order that it does not collide with a sprocket during gearshifts. The asymmetrical form and associated enlarged cross section of the chain link plate according to an embodiment make a significant contribution to the link plate being sufficiently stable, and being capable of withstanding the forces to be transmitted, despite the reduced material thickness in the region of the recess.

Figure 10:
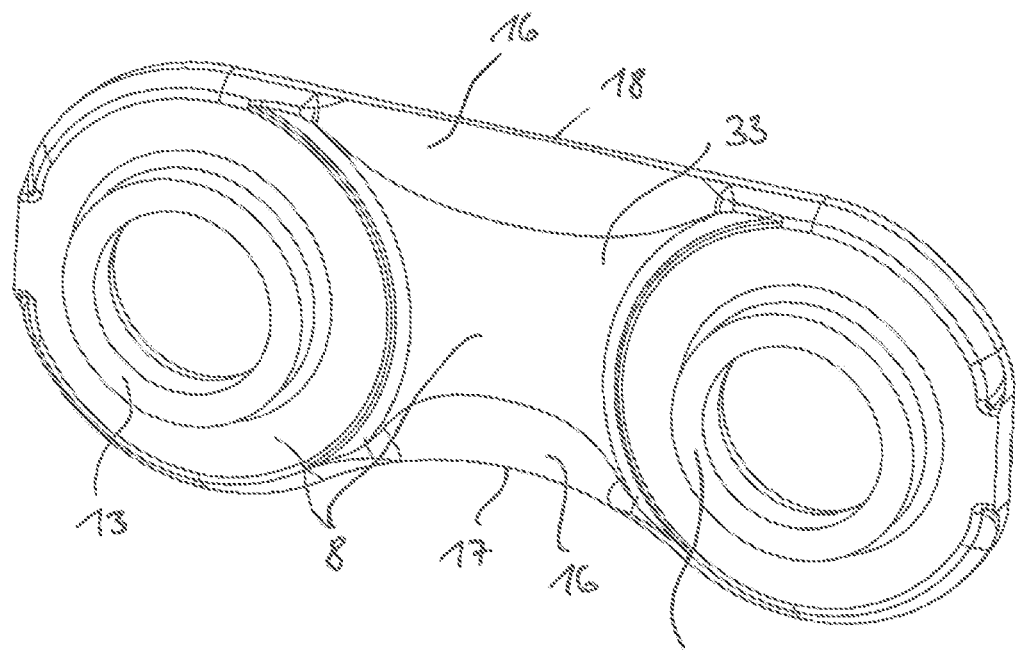

FIG. 10 shows the inner link plate of the chain as per FIGS. 8 and 9 in a perspective view, viewed from the inner surface of the link plate. Here, the recess (33), that is to say the depression of the connecting region (6) in relation to the two end regions (5), is clearly visible. The recess (33) is adjoined, as viewed in the transverse direction, by one catching bevel (16) in each case. The catching bevel (16) on the first outer contour (17) is of particular importance, because it is situated on the inner side (48) of the closed chain loop (47) and is brought into engagement with the teeth of the rear and front sprockets. In an example, the material thickness in the region of the recess (33) amounts to approximately 0.6 millimeter. The remaining material thickness of the inner link plate otherwise amounts to approximately 0.7 millimeter. The recess (33) thus has a depth of approximately 0.1 millimeter.

Figure 11:
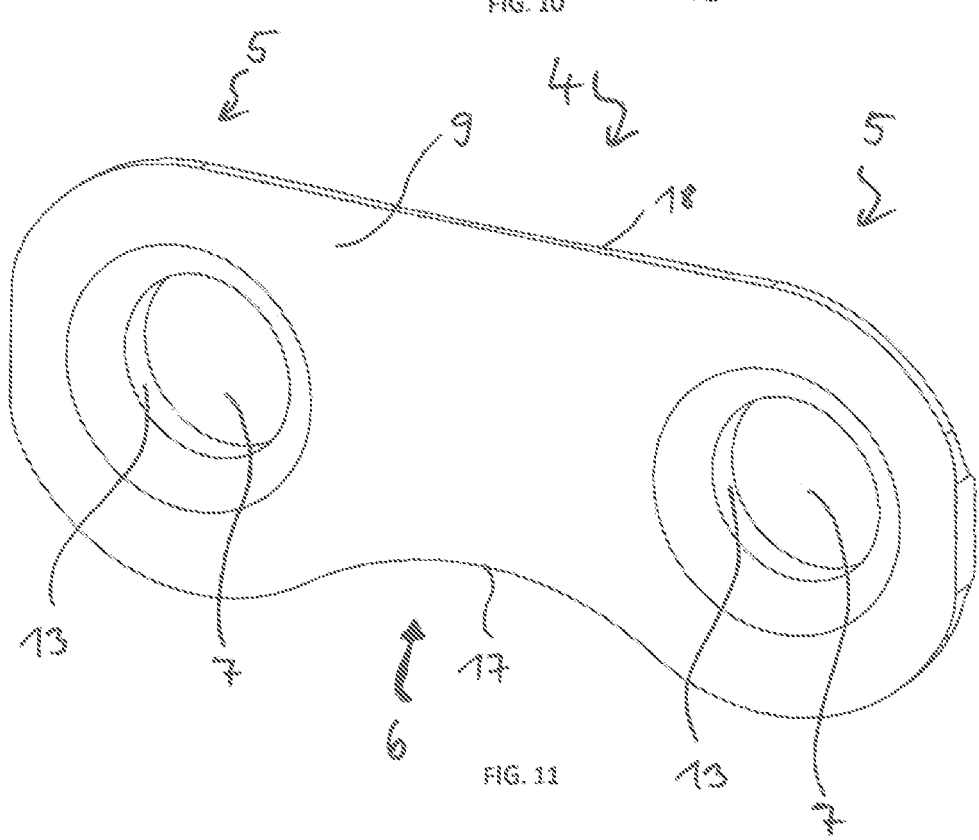

FIG. 11 shows the inner link plate of the chain as per FIGS. 8 and 9 in a perspective view, viewed from the outer surface of the link plate. The outer surface is preferably of flat form.

Figure 15:
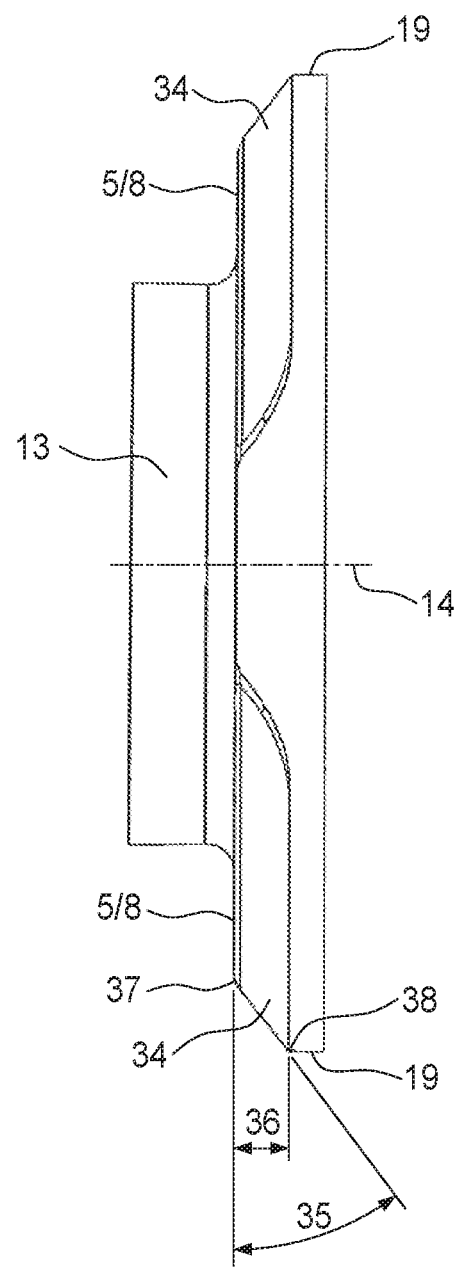

FIG. 15 shows the relationships at the bevel (34) on the rounded outer contour (19) at an end region (5). The bevel (34) forms an inner bevel edge (37) with the inner surface (8) and an outer bevel edge (38) with the rounded outer contour (19). The bevel depth (36) is measured in a direction parallel to the hole axis (14) between the inner bevel edge (37) and the outer bevel edge (38). The bevel angle (35) is determined in a plane radially with respect to the hole axis (14) between the plane of the inner surface (8) and the surface of the bevel (34). For certain conditions, it has proven to be expedient if the bevel angle (35) is small in the region of the inner link plate protrusion (25, 26). Then, the inner bevel edge (37) is situated radially further to the inside than the outer edges of the chain roller (11). It is thereby achieved that a tooth of a sprocket that enters the link plate intermediate space (24) encounters as wide a "run-in funnel" as possible, which is formed by the surfaces of the bevels on the two inner link plates (4) of a link plate pair. The tooth tip can then slide off the bevel (34) in an unhindered manner in a radially inward direction.

It has furthermore been found that the tooth tip, when entering the link plate intermediate space (24), reaches its final position with respect to the direction parallel to the hole axis (14) quickly if the bevel angle (35) is large. A bevel angle of 51 degrees has proven to be expedient for certain conditions.

There may be a smooth transition between the bevel angle of 51 degrees on the transverse protrusion and of 38 degrees on the longitudinal protrusion.

In FIG. 16, it can be seen how a piece of chain is formed into a closed chain loop for transmitting drive force, which chain loop has an inner side (48) and an outer side (49), being closed with two L-shaped fastener elements (46).

Figure 17:
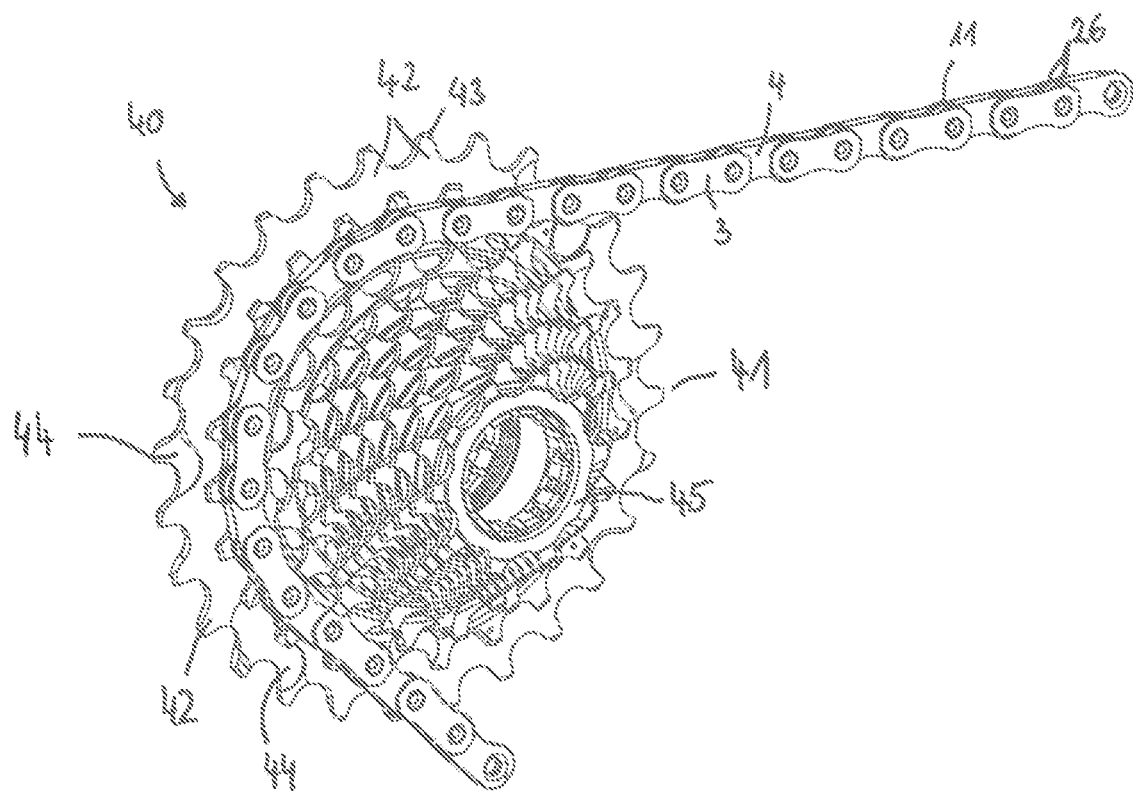
Figure 18:
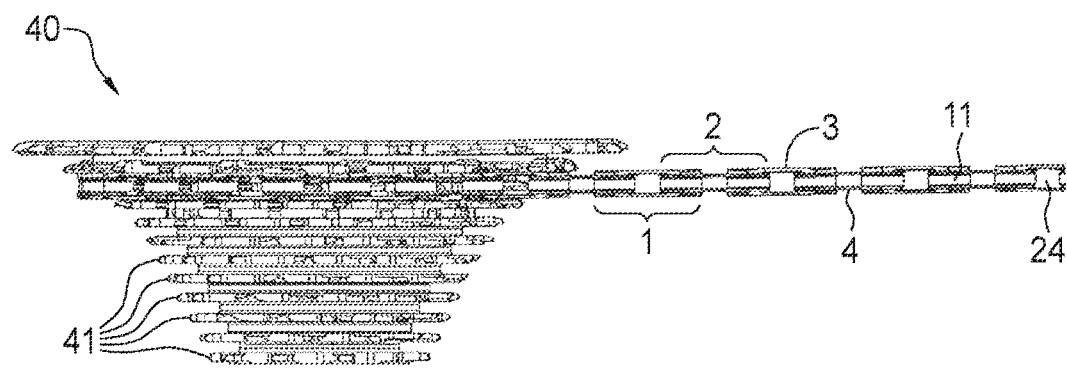

FIG. 17 shows the asymmetrical chain as per FIGS. 8 and 9 in engagement on a rear set of sprockets in a perspective view, and FIG. 18 shows the same in a plan view. The schematic illustrations show only a part of the drive train, which normally comprises a closed chain loop which runs through a gearshift mechanism with two chain-guiding rollers and engages into a front chain wheel arrangement. The front chain wheel arrangement normally comprises one, two or three chain wheels. In the case of a large number of rear sprockets, one or two front chain wheels may be sufficient.

Narrow chains are of importance in particular for multi-sprocket arrangements (40) with an increased number of eleven, twelve, thirteen or more sprockets (41). Owing to the small structural space in an axial direction, the sprockets (41) must be positioned with very small spacings to one another. The sprocket arrangement (40) that is shown comprises exactly twelve sprockets (41), which are positioned with predefined spacings to one another. To counteract the consequences of chain skew, the relatively small sprockets, in particular the smallest six sprockets, are arranged with a slightly larger spacing to one another than the relatively large sprockets, in particular the largest six sprockets. On the smallest sprocket (41) there is furthermore arranged a ring-shaped bead (45) which pushes the chain outward in an axial direction and thus reduces the consequence of chain skew. The chain that is shown is in engagement with the teeth (42) of the third-largest sprocket (41) of the multi-sprocket arrangement (40). The chain must be dimensioned to be sufficiently narrow that it fits into the free spaces between the sprockets (41) without colliding with the next smaller or next larger sprocket. The deflecting bevels and catching bevels on the outer and inner surfaces of the link plates interact, during gearshifts from one sprocket to the next sprocket, with the bevels (43) of the teeth (42) of the sprockets (41). The sprockets (41) have gearshift features (44) which permit gearshifts. Furthermore, it is possible in particular for the largest two sprockets (41) to have teeth (42) of different thicknesses in the axial direction, which teeth have a positive effect on the chain guidance. The thickening of the teeth (42) is preferably formed on the rear side of the sprockets, and is not visible here. Here, the thickening on the thick teeth is dimensioned such that a thick tooth fits into the link plate intermediate space (24) of an outer link plate link (1) but not into the relatively small link plate intermediate space (24) of an inner link plate link (2). In the case of sprockets with an even number of teeth, thick and thin teeth may alternate along the circumference. The indicated chain is in engagement with the illustrated multi-sprocket arrangement (40) and with a front chain wheel arrangement (58) with two chain wheels. In embodiments with only one chain wheel, the chain guidance on the front chain wheel (58) may likewise be improved through the use of alternating thick and thin teeth.

The chain is of particularly narrow construction. Firstly, the asymmetrical link plates (3, 4) permit a very small link plate thickness—the compensation of the material cross section in the connecting region of the link plates leads to an approximately unchanged tensile strength of the link plates. Furthermore, the tensile strength of the link plates (3, 4) can be additionally increased if the diameters of the end regions (5) are also enlarged. It is thus also possible at the end regions (5) for the material cross section of a relatively thin link plate to be compensated. In the case of an unchanged diameter of the hole (7) and an enlarged diameter of the end regions (5), the ring spacing (27) is thus also enlarged, which further increases the tensile strength of the link plate. In this regard, see FIG. 12.

It is additionally possible for use to be made of particularly narrow chain rollers (11) with an increased chain roller diameter and which likewise contribute to reducing the overall width of the chain. The increased chain roller diameter contributes to reducing the contact pressure between the chain roller and the load flank of the tooth. The increased chain roller diameter leads to an increased contact area between the chain roller and the load flank of the tooth, and thus compensates for the reduced chain roller width. Furthermore, an increased chain roller diameter together with an increased diameter of the end regions (5) of the inner link plates (4) permits an unchanged transverse protrusion (26) of the inner link plate (4) beyond the chain roller (11). In this regard, see FIG. 8.

The discussed measures for reducing the overall chain width, including compensation of the material cross section in the connecting region and/or at the end regions of the link plates, tensile strength, compensation of the contact area between the chain roller and tooth, and contact pressure, may be used separately or in combination. A particularly narrow, stable and wear-resistant chain is obtained if the measures are combined.

Figure 19:
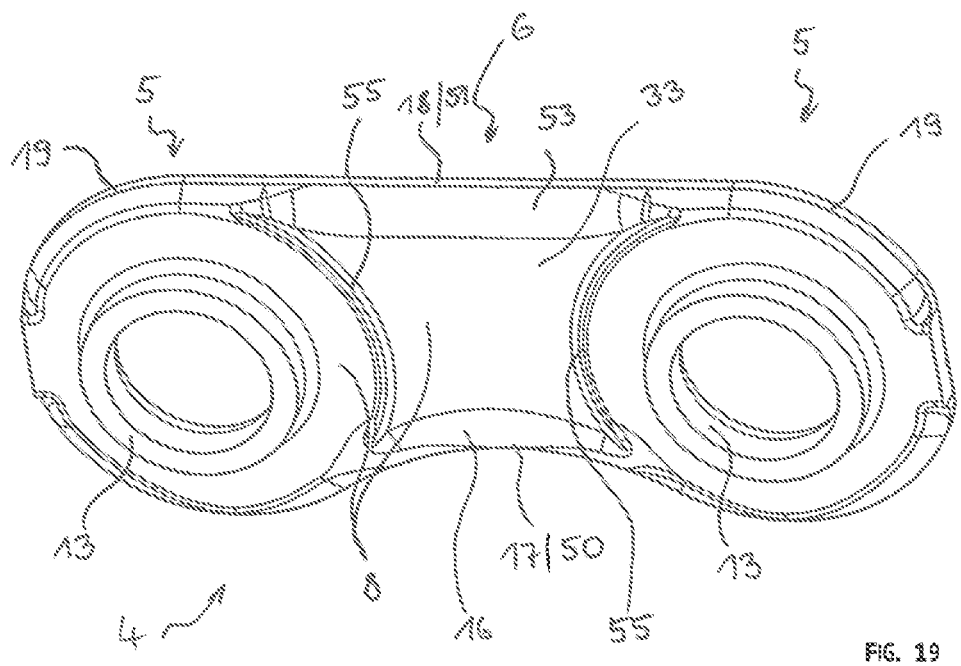
FIG. 19 shows the inner link plate of an embodiment modified in relation to the embodiment of the chain as per FIGS. 8 and 9 in a perspective view, viewed from the inner surface of the link plate.
Figure 20:
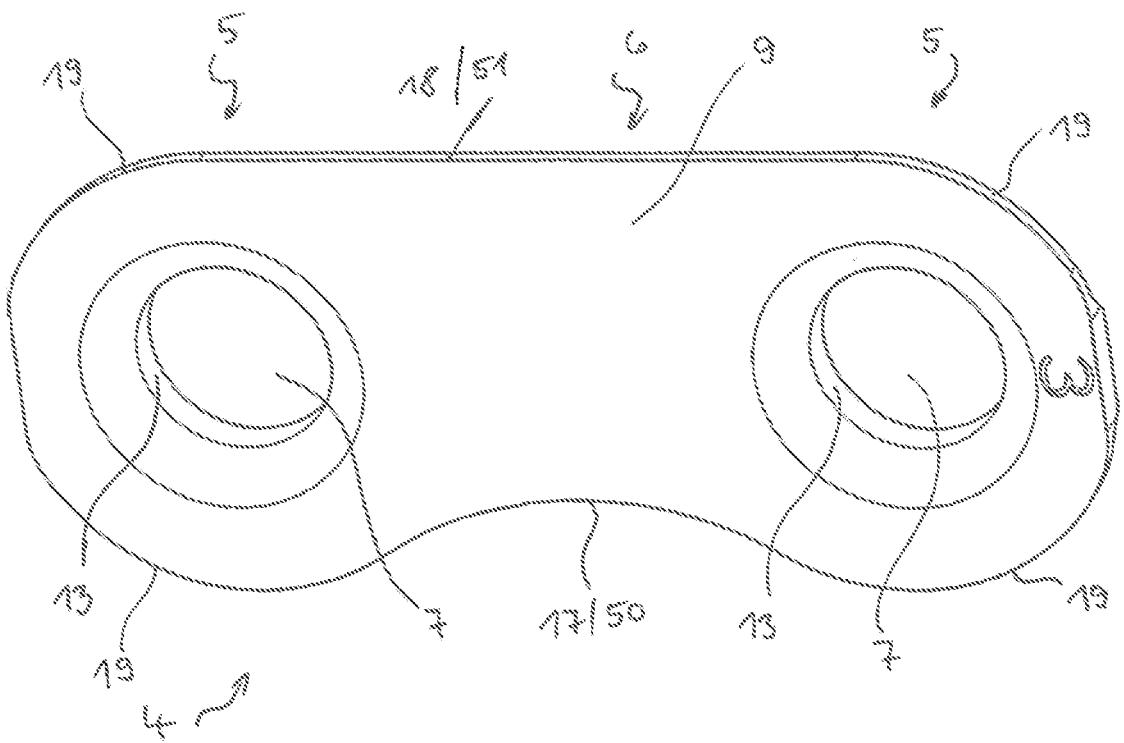
FIG. 20 shows the inner link plate as per FIG. 19 in a perspective view, viewed from the outer surface of the link plate.
Figure 21:
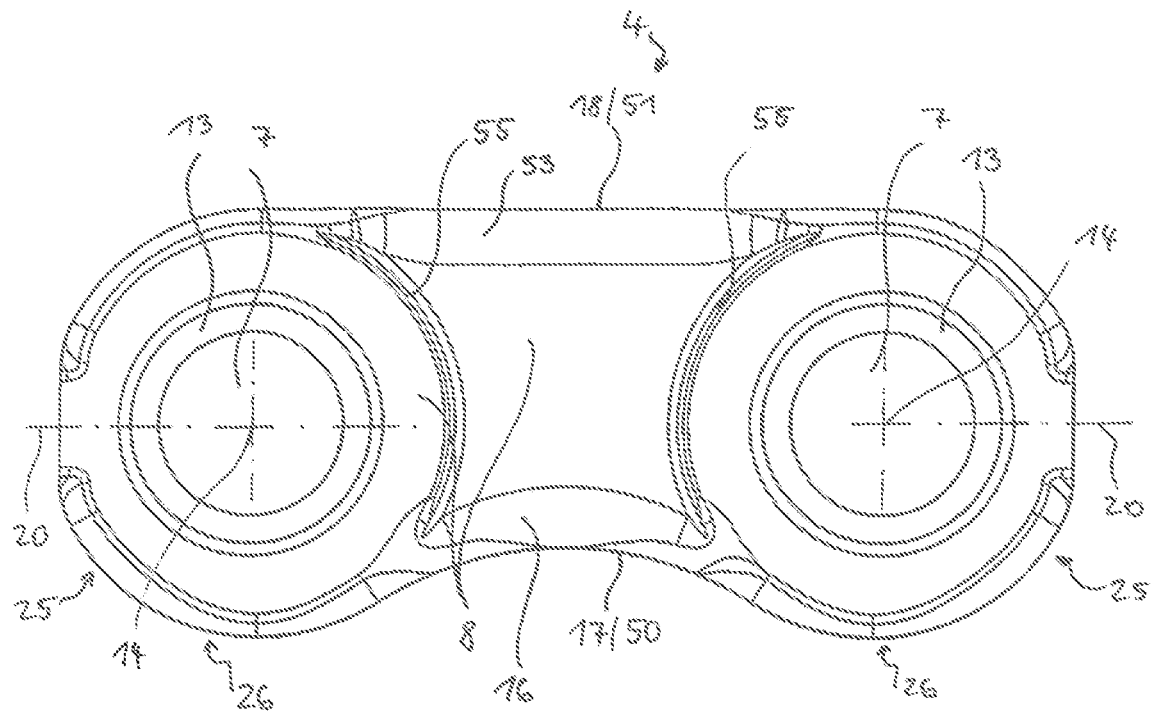
FIG. 21 shows the inner link plate as per FIG. 19, viewed from the inner surface of the link plate in the direction of the holes for receiving the chain pins.

The second embodiment of an inner link plate (4) according to the an embodiment is illustrated in FIGS. 19 and 20 in a perspective illustration and in FIG. 21 in a view with a viewing direction perpendicular to the outer surface (9). This view is also parallel to the hole axes (14). Major features have been adopted from the embodiment as per FIGS. 8 to 15.

The second embodiment realizes the principles of arranging guide bevels (53), but no catching bevels (16) and also no deflecting bevels (15), on the guide side (51) of the chain. This arrangement may use fewer peripheral features than the embodiment as per FIGS. 8 to 15.

The inner link plate (4) has two rounded end regions (5) which are connected by the connecting region (6). The second outer contour (18) has a rectilinear profile and transitions tangentially into the outer contour on the two rounded end regions (5). Holes (7) are provided substantially concentrically with respect to the rounded outer contour (19) of the rounded end regions (5). Each of the hole axes (14) is also the axis of in each case one hollow cylindrical collar (13) on the inner surface (8) of the inner link plate (4).

The planar outer surface (9) of the inner link plate (4) can be seen in FIG. 20. The spacing between the outer surface (9) and the inner surface (8) radially directly outside the collars (13) corresponds to the material thickness.

The material thickness of the inner link plates (4) in the two embodiments of the chain according to FIGS. 8 to 18 and FIGS. 19 to 23 amounts to 0.73 millimeter, in contrast to 0.77 millimeter in the case of a chain as per FIGS. 1 to 7.

The spacing between the outer surface (9) and the inner surface (8) in the connecting region (6) is reduced in relation to the material thickness owing to the arrangement of a recess (33) which is situated on the same side of the inner link plate (4) as the collars. A step (55) is formed between the inner surface (8) around a collar (13) and the inner surface (8) at the connecting region (6) owing to the recess (33). The step (55) is concentric with respect to the hole axis (14).

The second outer contour (18) on the inner link plate (4) corresponds to the guide side (51) of the chain joined to form a chain loop. Correspondingly, on the second outer contour (18), a guide bevel (53) is situated between the inner surface (8) at the connecting region (6) and the rounded outer contour (19) at the two end regions (5), for the purposes of interacting with the chain-guiding roller of a rear gearshift mechanism. Following the straight profile of the second outer contour (18), the guide bevel (53) likewise has a straight profile, and transitions at its two ends into the bevel (34) at the rounded outer contour (19).

There may be a sharp edge or a rounded transition between the guide bevel (53) and the inner surface (8) at the connecting region (6).

The first outer contour (17) on the inner link plate (4) corresponds to the engagement side (50) of the chain joined to form a chain loop. Correspondingly, on the first outer contour (17), a catching bevel (16) is situated between the inner surface (8) at the connecting region (6) and the rounded outer contour (19) at the two end regions (5), for the purposes of interacting with a tooth on a sprocket. Correspondingly to the arcuate profile of the first outer contour (17), the catching bevel (16) likewise has an arcuate profile. The catching bevel (16) transitions, at its two ends, firstly into a transition surface and then into the bevel (34) at the rounded outer contour (19). The formation of a transition surface is consistent with the desire for realizing as smooth a transition as possible, and also avoiding a noticeable gap between the inner link plate (4) and the chain rollers (11) rotatably mounted in each case on the collars (13) in the assembled state of the chain. A gap at said location would under some circumstances permit the entry of a tip of a sprocket tooth, with the risk of chain jump-off.

There may be a sharp edge or a rounded transition between the catching bevel (16) and the inner surface (8) at the connecting region (6).

It can be seen particularly clearly in FIG. 21 that the rounded outer contour (19) at the two end regions (5) is not arranged exactly concentrically with respect to the hole axis (14). The radial spacing between hole axis (14) in the direction of the longitudinal axis (20) of the inner link plate (4) forms part of the overall length of the inner link plate. Said overall length has been preserved in relation to embodiments of the inner link plate, whereas the radial spacing of the rounded outer contour (19) to the hole axis (14) in a direction perpendicular to the longitudinal axis (20) has, together with the rounded outer contour (19) of the inner link plate (4), been enlarged and thus relocated radially outward. The relocation of the rounded outer contour (19) of outer link plate (3) and inner link plate (4) radially outward in the same direction are measures in the realization of a width of the chain measured in a direction parallel to the axis of the chain pins (12) with the reduction of the thickness of the material of the inner link plate (4) and of the width of the chain roller (11) measured in a direction parallel to the chain pin (12).

In the two embodiments of the chain as per FIGS. 8 to 18 and FIGS. 19 to 23, the diameter of the chain roller (11) amounts to 7.9 millimeters, in contrast to 7.7 millimeters in the case of a chain as per FIGS. 1 to 7.

In the two embodiments of the chain as per FIGS. 8 to 18 and FIGS. 19 to 23, the width of the chain roller (11) amounts to 1.85 millimeters, by contrast to 1.7 millimeters in the case of a chain as per FIGS. 1 to 7.

The bevel (34) has a bevel angle (35) which is variable along its profile on the rounded outer contour (19). Thus, the varying requirements with regard to the longitudinal protrusion (25) in relation to the transverse protrusion (26) are allowed for, as described in detail in conjunction with FIG. 15.

That part of the inner surface (8) which protrudes in relation to the chain roller (not shown) and which does not have a bevel is wider in the radial direction at the transverse protrusion (26) than at the longitudinal protrusion (25). Thus, during the entry of a sprocket tooth into the link plate intermediate space, the transverse protrusion facilitates an effective centering action on the sprocket tooth.

A modification of FIGS. 19 to 21 is possible with regard to the design of the guide side (51) of the inner link plate (4).

The longitudinal protrusion (25) with the bevel (34), or at least said bevel (34) alone, would not need to extend as far in the direction of the longitudinal axis (20), but rather could be of shorter form, because the contact with a guide tooth (54) on a chain-guiding roller could no longer occur there in any case. Correspondingly, on the guide side, the extent of the bevel (34) on the longitudinal protrusion would then be extended as far as the longitudinal axis (20) and possibly even beyond the longitudinal axis (20). This could be configured such that the longitudinal protrusion (25) without bevel (34), which in FIG. 21 is arranged to both sides of the longitudinal axis (20), would be relocated to the guide side (51).

Figure 22:
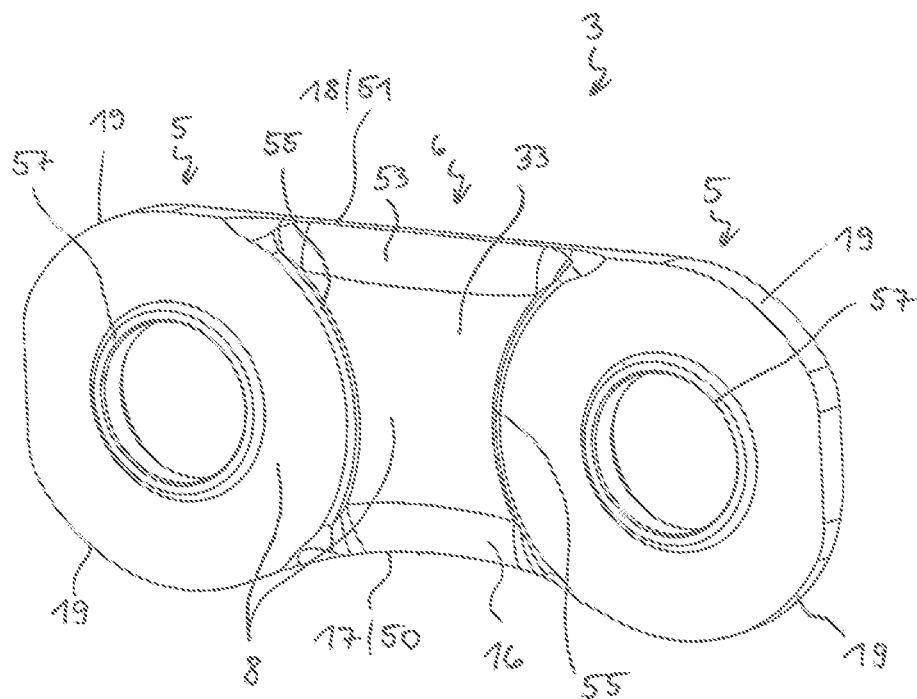
FIG. 22 shows the outer link plate of the chain of an embodiment modified in relation to the embodiment of the chain as per FIGS. 8 and 9 in a perspective view, viewed from the inner surface of the link plate.
Figure 23:
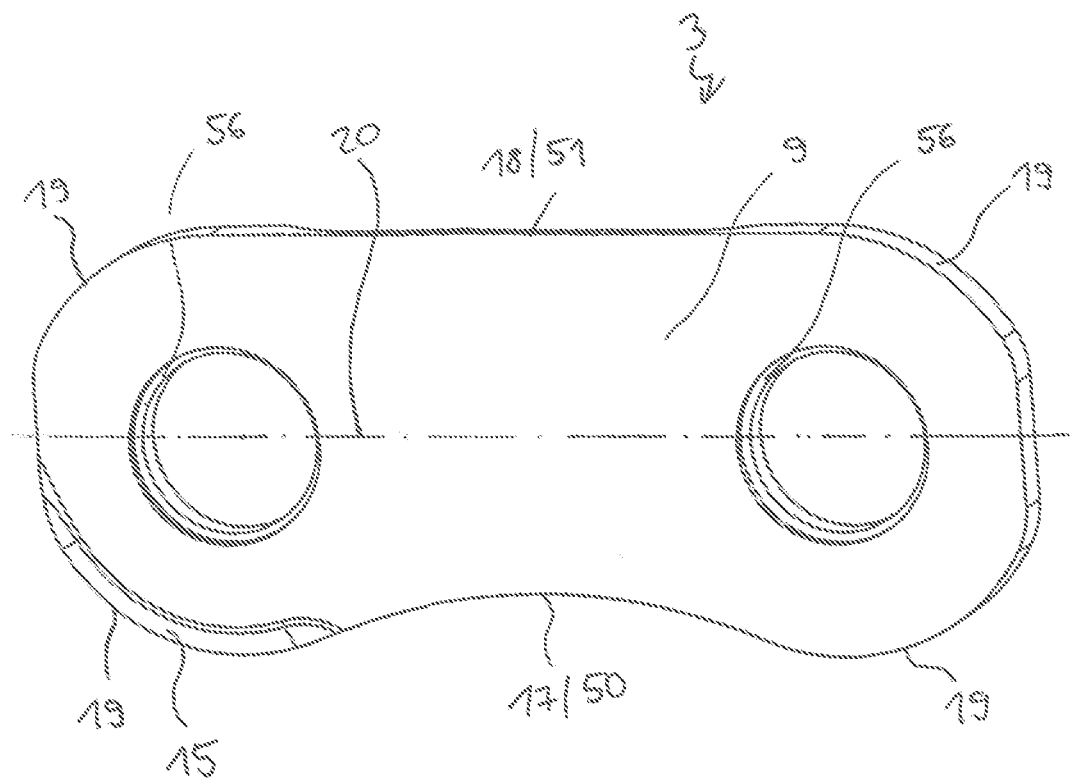
FIG. 23 shows the outer link plate as per FIG. 22 in a perspective view, viewed from the outer surface of the link plate.
Figure 24:
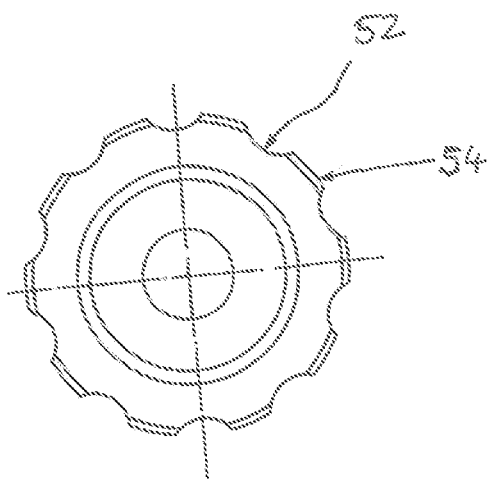
FIG. 24 shows a chain-guiding roller for the chain guide on a rear gearshift mechanism.

The second embodiment of an outer link plate (3) according to an embodiment is shown in a perspective illustration in FIGS. 22 and 23. Major features have been adopted from the embodiment as per FIGS. 13 and 14.

In the second embodiment, the arrangement of two rounded end regions (5) which are connected by the connecting region (6) has been adopted from the first embodiment.

The second outer contour (18) has a rectilinear profile and transitions tangentially into the rounded outer contour (19) on the two rounded end regions (5).

Holes (7) with the associated hole axes (14) are provided substantially concentrically with respect to the rounded outer contour (19) of the rounded end regions (5), the margin of which holes has, in relation to the outer side (9) of the outer link plate (3), an encircling depression (56) for receiving the flared end of the chain pin (12) and has, on the side of the inner surfaces (8), an encircling flange (57). Thus, despite the depression (56), a large contact area between hole and chain pin (12) is realized, which is expedient for realizing a large holding force between chain pin (12) and outer link plate (3).

In FIG. 23, the substantially planar outer surface (9) of the outer link plate (3) can be seen. FIG. 22 shows the inner surface (8) of the outer link plate (3), which, with the exception of the flange at the margin of the hole (7), is likewise planar.

The spacing between the outer surface (9) and the inner surface (8) radially directly outside the flange corresponds to the material thickness.

In the two embodiments of the chain as per FIGS. 8 to 18 and FIGS. 19 to 23, the material thickness of the outer link plate (3) amounts to 0.75 millimeter, in contrast to 0.80 millimeter in the case of a chain as per FIGS. 1 to 7.

The spacing between the outer surface (9) and the inner surface (8) in the connecting region (6) is reduced in relation to the material thickness owing to the arrangement of a recess (33) which is situated on the same side of the inner link plate (4) as the flange. A step (55) is formed between the inner surface (8) around a collar (13) and the inner surface (8) at the connecting region (6) owing to the recess (33). Said step (55) is concentric with respect to the hole axis (14).

The second outer contour (18) on the outer link plate (3) corresponds to the guide side (51) of the chain joined to form a chain loop. Correspondingly, on the second outer contour (18), a guide bevel (53) is situated between the inner surface (8) at the connecting region (6) and the rounded outer contour (19) at the two end regions (5), for the purposes of interacting with the chain-guiding roller of a rear gearshift mechanism. Following the straight profile of the second outer contour (18), the guide bevel (53) likewise has a straight profile, and transitions at its two ends into the bevel (34) at the rounded outer contour (19).

There may be a sharp edge or a rounded transition between the guide bevel (53) and the inner surface (8) at the connecting region (6).

The first outer contour (17) on the outer link plate (3) corresponds to the engagement side (50) of the chain joined to form a chain loop. Correspondingly, on the first outer contour (17), a catching bevel (16) is situated between the inner surface (8) at the connecting region (6) and the rounded outer contour (19) at the two end regions (5), for the purposes of interacting with a tooth on a sprocket or a chain loop. The catching bevel (16) likewise has an arcuate profile corresponding to the arcuate profile of the first outer contour (17). The catching bevel (16) transitions, at its two ends, firstly into a transition surface and then into the bevel (34) at the rounded outer contour (19). The formation of a transition surface is consistent with the desire for realizing as smooth a transition as possible, and also avoiding a noticeable gap between the outer link plate (3) and the adjacent inner link plate (4). A gap at said location would under some circumstances permit the entry of a tip of a sprocket tooth, with the risk of chain jump-off.

There may be a sharp edge or a rounded transition between the catching bevel (16) and the inner surface (8) at the connecting region (6).

A deflecting bevel (15) is provided between the leading side of the engagement side (50) of the outer link plate (3) at the outer surface (9) of the rounded outer contour (19) and the outer surface (9) of the outer link plate (3). On the guide side (51) of the outer link plate (3), deflecting bevels are omitted entirely. In relation to the second embodiment of the chain link plates (3, 4) illustrated in FIGS. 19 to 23, a further modification is possible on the guide side (51). Both the rounded outer contour (19) on the end regions (5) or the second outer contour (18) at the connecting region (6) may be relocated further away from the longitudinal axis (20). This may be performed in order to further improve the contact between the guide side (51) of the chain and a chain-guiding roller (52) of a rear gearshift mechanism. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Figure 25:
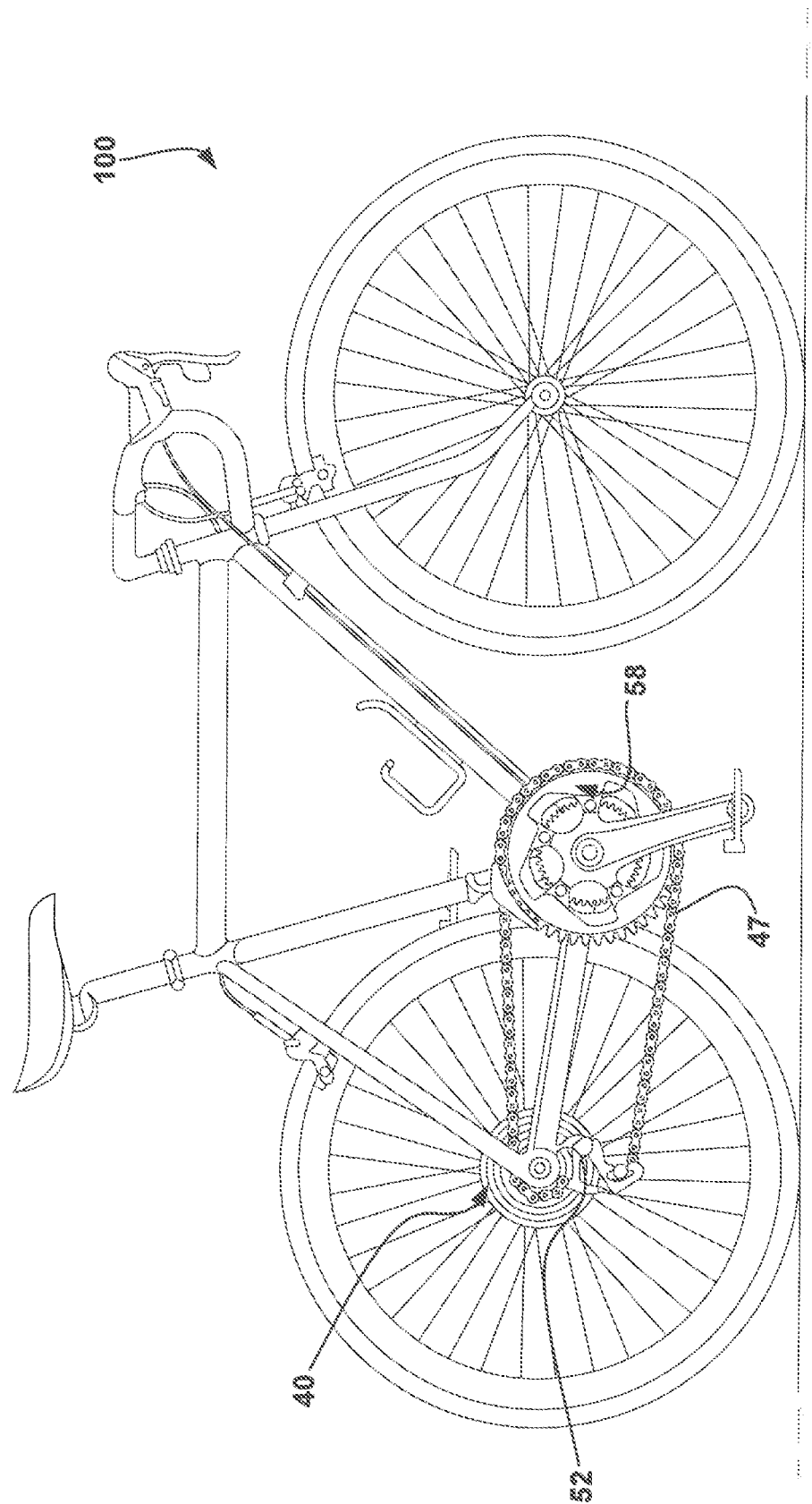
FIG. 25 shows a bicycle on which a roller-type chain is employed.

Referring to FIG. 25, a bicycle (100), as above, may be provided. The chain loop (47) is shown engaging the front chain wheel assembly (58) and the multi-sprocket assembly (40) on the inner side (48) of the chain loop (47). The chain-guiding roller (52) is shown engaging the outer side (49) of the chain loop (47).

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this depiction should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to fewer than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A roller-type chain for a bicycle, the chain comprising:
a plurality of inner link plates,
a plurality of outer link plates,
a plurality of chain pins, and
a plurality of chain rollers;
wherein at least one of the plurality of chain pins is received rotatably in holes of at least one of the plurality of inner link plates and is rotationally fixed in holes of at least one of the plurality of the outer link plates;
wherein the pluralities of inner and outer link plates comprise:
an engagement side on an outer periphery corresponding to one side of a longitudinal plane in which the centers of the holes lie, and
a guide side opposite the engagement side across the longitudinal plane;
wherein, on the engagement side, the pluralities of inner and outer link plates comprise a plurality of catching bevels and the plurality of outer link plates includes a plurality of deflecting bevels configured for interaction with front and rear pluralities of teeth disposed on the front and rear sprockets;
wherein, on the guide side, the pluralities of inner and outer link plates comprise a plurality of guide bevels, the plurality of guide bevels configured to guide the chain through interaction with a chain-guiding roller of a rear gearshift mechanism, and
wherein the outer periphery of the plurality of inner link plates and the plurality of outer link plates has a straight profile on the guide side of the chain which runs tangentially with respect to two rounded outer contours, each of the rounded outer contours being concentric to the respective holes of the respective link plates and
wherein the inner link plates and the outer link plates include an asymmetric recess with respect to the longitudinal plane between the holes.

2. The roller-type chain according to claim 1, wherein a pin spacing between an adjacent pair of the plurality of chain pins corresponds to a chain pitch of 12.7 millimeters and wherein an outer roller diameter of at least one of the plurality of chain rollers is between 7.8 millimeters and 8.5 millimeters.

3. The roller-type chain according to claim 2, wherein a ratio of the outer roller diameter to the chain pitch is less than 0.64 to 1.

4. The roller-type chain according to claim 1, wherein the guide side of the chain is arranged at the outer side of a chain loop.

* * * * *